(12) United States Patent
Brown et al.

(10) Patent No.: US 11,987,332 B2
(45) Date of Patent: May 21, 2024

(54) CONTROL SYSTEM FOR BOAT LIFT

(71) Applicant: Premier Remotes and Products, LLC, Jacksonville, FL (US)

(72) Inventors: Matt Brown, Jacksonville, FL (US); Dustin Smith, Jacksonville, FL (US); Paul Berkemeier, Grand Rapids, MI (US); Mark Austin, Bristol, IN (US)

(73) Assignee: Premier Remotes and Products, LLC, Jacksonville, FL (US)

( * ) Notice: Subject to any disclaimer, the term of this patent is extended or adjusted under 35 U.S.C. 154(b) by 258 days.

(21) Appl. No.: 17/747,161

(22) Filed: May 18, 2022

(65) Prior Publication Data

US 2022/0380007 A1  Dec. 1, 2022

Related U.S. Application Data

(60) Provisional application No. 63/192,879, filed on May 25, 2021.

(51) Int. Cl.
*B63C 3/06* (2006.01)
*E02C 5/00* (2006.01)
*H02P 1/40* (2006.01)

(52) U.S. Cl.
CPC .............. *B63C 3/06* (2013.01); *E02C 5/00* (2013.01); *H02P 1/40* (2013.01)

(58) Field of Classification Search
CPC ..... E02C 5/00; H02P 1/40; B63C 3/06; B63C 3/12
See application file for complete search history.

(56) References Cited

U.S. PATENT DOCUMENTS 9,624,076 B2 *   4/2017   Hall ..................... B66D 1/26

\* cited by examiner

*Primary Examiner* — Said Bouziane
(74) *Attorney, Agent, or Firm* — MCANDREWS HELD & MALLOY, LTD

(57) ABSTRACT

A boat lift controller may include a digital switch, a power-isolation relay, and a motor-direction-select relay, together which control a motor. The digital switch may provide power to the power-isolation relay. The power-isolation relay may provide power to the motor-direction-select relay and to the motor. The motor-direction-select relay may control the direction in which the shaft of the motor turns.

20 Claims, 24 Drawing Sheets

CONTROL SYSTEM FOR BOAT LIFT

CROSS REFERENCE TO RELATED APPLICATIONS

This application claims priority to U.S. No. 63/192,879, which is incorporated by reference herein in its entirety.

BACKGROUND

Generally, the disclosure herein relates to control systems that control operation of motors and other electrical components in boat lifts. Such a boat lift can have four motors, which operate together to vertically move a boat in and out of the water. Such boats may be recreational boats, although the disclosure herein is not limited to any particular type of boat lift or boats.

At least in the U.S. and Canada, many boat lifts utilize single-phase, dual-voltage, dual-direction motors. The motors can be controlled by drum switches or mechanical contactors. The boat lift may have a platform upon which the boat rests. The platform may move vertically by means of cables that spool on cable spindles that are driven by the motors. If the motors turn clockwise, the cable may wind on the spindle causing the boat lift platform to rise. If the motors turn counterclockwise the cable may unspool and the platform lowers. The motors may be connected to an controller, which may contain circuitry to control the application of power to the motors. Limit switches can be electrically connected to the controller. Such switches may sense (mechanically or otherwise) when the boat has reached a certain position (directly or indirectly). When such an event occurs, limit switches may cause an interruption in electrical current to cause the motors to stop.

SUMMARY

According to embodiments, a control system for controlling at least one motor on a boat lift, the control system includes: a processor configured to output a first digital-relay control signal and a first power-isolation relay control signal; a first digital relay including a control input, a high-voltage input, and a high-voltage output, wherein the control input of the first digital relay is configured to receive the first digital-relay control signal from the processor, wherein the high-voltage input of the first digital relay is configured to receive high voltage, wherein the high-voltage output of the first digital relay is configured to selectively output the high voltage based on a state of the first digital-relay control signal; a first power-isolation relay configured to selectively isolate the high voltage from a first motor, wherein the first power-isolation relay includes a control input, a high-voltage input, and a high-voltage output, wherein the control input of the first power-isolation relay is configured to receive the first power-isolation relay control signal from the processor, wherein the high-voltage input of the first power-isolation relay is configured to receive the high-voltage from the output of the first switching component, wherein the high-voltage output of the first power-isolation relay is configured to selectively supply the high voltage to the first motor based on a state of the first power-isolation relay control signal; wherein the processor is configured to cause the first motor to be energized by: changing a state of the first power-isolation relay control signal to actuate the first power-isolation relay, such that the high-voltage input of the first power-isolation relay becomes electrically connected to the high-voltage output of the first power-isolation relay, and after said changing the state of the first power-isolation relay control signal to actuate the first power-isolation relay, changing a state of the first digital-relay control signal to activate the first digital relay, such that the high-voltage input of the first digital relay becomes electrically connected to the high-voltage output of the first power-isolation relay; and wherein the processor is configured to cause the first motor to be de-energized by: changing a state of the first digital-relay control signal to deactivate the first digital relay, such that the high-voltage input of the first digital relay becomes electrically disconnected to the high-voltage output of the first digital relay, and after said changing the state of the first digital-relay control signal to deactivate the first digital relay, changing a state of the first power-isolation relay control signal to de-actuate the first power-isolation relay, such that the high-voltage input of the first power-isolation relay becomes electrically disconnected from the high-voltage output of the first power-isolation relay. The first power-isolation relay may include a mechanical relay.

The control system may further include a first motor-direction-select relay including a control input, a high-voltage input, a neutral input, a first output, and a second output, wherein the processor is configured to output a first direction-control signal, wherein the first direction-control signal comprises a forward state and a reverse state, wherein the control input of the first motor-direction-selection relay is configured to receive the first direction-control signal, the high-voltage input of the first motor-direction-select relay is configured to receive the high voltage, the neutral input of the first motor-direction-select relay is configured to receive neutral, wherein, when the first direction-control signal is in the forward state, the first motor-direction-select relay is configured to electrically connect the first output with the high-voltage input and electrically connect the second output with the neutral input, and wherein, when the first direction-control signal is in the reverse state, the first motor-direction-select relay is configured to electrically connect the first output with the neutral input and electrically connect the second output with the high-voltage input.

The processor may be further configured to energize the first motor by, before said changing the state of the first digital-relay control signal to activate the first digital relay, changing the state of the first direction-control signal to either the forward state or the reverse state. The first motor-direction-select relay may include a double-pole double-throw (DPDT) relay. The processor may be further configured to output a second digital-relay control signal independently from the first digital-relay control signal, and wherein the processor may be further configured to output a second power-isolation relay control signal independently from the first power-isolation relay control signal. The control system may further include: a second digital relay including a control input, a high-voltage input, and a high-voltage output, wherein the control input of the second digital relay is configured to receive the second digital-relay control signal from the processor, wherein the high-voltage input of the second digital relay is configured to receive the high voltage, wherein the high-voltage output of the second digital relay is configured to selectively output the high voltage based on a state of the second digital-relay control signal; a second power-isolation relay configured to selectively isolate the high voltage from a second motor, wherein the second power-isolation relay includes a control input, a high-voltage input, and a high-voltage output, wherein the control input of the second power-isolation relay is configured to receive the second power-isolation relay control signal from the processor, wherein the high-voltage input of the second power-isolation relay is configured to receive the high voltage from the output of the second switching component, wherein the high-voltage output of the second power-isolation relay is configured to selectively supply the high voltage to the second motor based on a state of the second power-isolation relay control signal; wherein the processor is configured to cause the second motor to be energized by: changing a state of the second power-isolation relay control signal to actuate the second power-isolation relay, such that the high-voltage input of the second power-isolation relay becomes electrically connected to the high-voltage output of the second power-isolation relay, and after said changing the state of the second power-isolation relay control signal to actuate the second power-isolation relay, changing a state of the second digital-relay control signal to activate the second digital relay, such that the high-voltage input of the second digital relay becomes electrically connected to the high-voltage output of the second power-isolation relay; and wherein the processor is configured to cause the second motor to be de-energized by: changing a state of the second digital-relay control signal to deactivate the second digital relay, such that the high-voltage input of the second digital relay becomes electrically disconnected to the high-voltage output of the second digital relay, and after said changing the state of the second digital-relay control signal to deactivate the second digital relay, changing a state of the second power-isolation relay control signal to de-actuate the second power-isolation relay, such that the high-voltage input of the second power-isolation relay becomes electrically disconnected from the high-voltage output of the second power-isolation relay. The second power-isolation relay may include a mechanical relay.

The control system may further include a second motor-direction-select relay including a control input, a high-voltage input, a neutral input, a first output, and a second output, wherein the processor is configured to output a second direction-control signal, wherein the second direction-control signal comprises a forward state and a reverse state, wherein the control input of the second motor-direction-selection relay is configured to receive the second direction-control signal, the high-voltage input of the second motor-direction-select relay is configured to receive the high voltage, the neutral input of the second motor-direction-select relay is configured to receive neutral, wherein, when the second direction-control signal is in the forward state, the second motor-direction-select relay is configured to electrically connect the first output with the high-voltage input and electrically connect the second output with the neutral input, and wherein, when the second direction-control signal is in the reverse state, the second motor-direction-select relay is configured to electrically connect the first output with the neutral input and electrically connect the second output with the high-voltage input. The control system may further be configured to energize the motor by, before said changing the state of the second digital-relay control signal to activate the second digital relay, changing the state of the second direction-control signal to one of the forward state or the reverse state. The processor may be further configured to: control the first digital-relay control signal and the second digital-relay control signal synchronously. The processor may be further configured control the first power-isolation relay control signal and the second power-isolation relay control signal synchronously; control the first digital-relay control signal and the second digital-relay control signal synchronously; control the first power-isolation relay control signal and the second power-isolation relay control signal synchronously; and control the first direction-control signal and the second direction-control signal synchronously.

The control system may further include a first current sensor configured to measure a current provided to the first motor and output a first current signal, wherein the processor is configured to receive the first current signal and determine an irregularity based on the first current signal; and a second current sensor configured to measure a current provided to the second motor and output a second current signal, wherein the processor is configured to receive the second current signal and determine an irregularity based on the second current signal.

According to embodiments, a control system for controlling at least one motor on a boat lift, includes: a processor configured to output at least one high-voltage-relay control signal and at least one additional signal; at least one high-voltage relay, each of the at least one high-voltage relay including a high-voltage input configured to receive high voltage, a high-voltage output configured to be electrically connected to a corresponding at least one motor, and a control input configured to receive a corresponding at least one high-voltage-relay control signal, wherein each of the at least one high-voltage relay is configured to selectively electrically connect or disconnect the high-voltage input to the high-voltage output based on a state of the corresponding at least one high-voltage-relay control signal; and at least one additional relay, each including an input, an output configured to electrically connect to each of the at least one motor, and a control input configured to receive a corresponding at least one additional signal, wherein each of the at least one additional relay is configured to selectively electrically connect or disconnect the input to the output based on a state of the corresponding at least one additional signal, wherein the processor is configured to change a state for each of the at least one additional signal during a process in which each of the at least one high-voltage relay is controlled to electrically connect the high-voltage input with the high-voltage output, such that each of the at least one additional relay electrically connects the input with the output, and wherein the processor is configured to change a state for each of the at least one additional signal during a process in which each of the at least one high-voltage relay is controlled to electrically disconnect the high-voltage input with the high-voltage output, such that each of the at least one additional relay electrically disconnects the input from the output, wherein the input of each of the at least one additional relay is configured to be connected to at least one of ground or neutral. The input at least one of the at least one additional relay may be configured to be connected to ground. The input of at least one of the at least one additional relay may be configured to be connected to neutral. The at least one additional relay may include a first additional relay for which the input is configured to be connected to ground, and a second additional relay for which the input is configured to be connected to neutral.

According to embodiments, a control system for controlling at least one motor on a boat lift having a movable frame that moves in response to movement of the at least one motor, the control system includes: at least one relay configured to selectively switch power to a corresponding one of the at least one motor; at least one current sensor, each configured to measure current flowing to a corresponding one of the at least one motor and responsively generate a corresponding at least one current sensor signal; a processor configured to control the at least one relay to turn ON the at least one motor, receive the at least one current sensor signal, determine an inferred vertical position of the moveable frame based on the at least one current sensor signal, and turn OFF the at least one motor when the inferred vertical position of the moveable reaches at least one predetermined limit. The at least one predetermined limit may comprise a maximum inferred vertical position limit and a minimum inferred vertical position limit. The processor may be configured to determine the inferred vertical position of the moveable frame by processing the at least one current signal to track changes in a phase of the corresponding at least one motor. The processor may be configured to determine the inferred vertical position of the moveable frame by processing the at least one current sensor signal to count a number of revolutions of a shaft in the corresponding at least one motor. The processor may be further configured to transmit feedback to a device across a network, wherein the feedback includes information about the inferred vertical position off the moveable frame.

BRIEF DESCRIPTION OF SEVERAL VIEWS OF THE DRAWINGS

FIGS. 5A, 5B, 5C, 5D, 5E, 5F, 5G, 5H, 5I, 5J, 5K, 5L, 5M, 5N, 5O, 5P, 5Q, and 5R show electrical schematics of a boat lift controller, according to embodiments herein.

Figure 1:
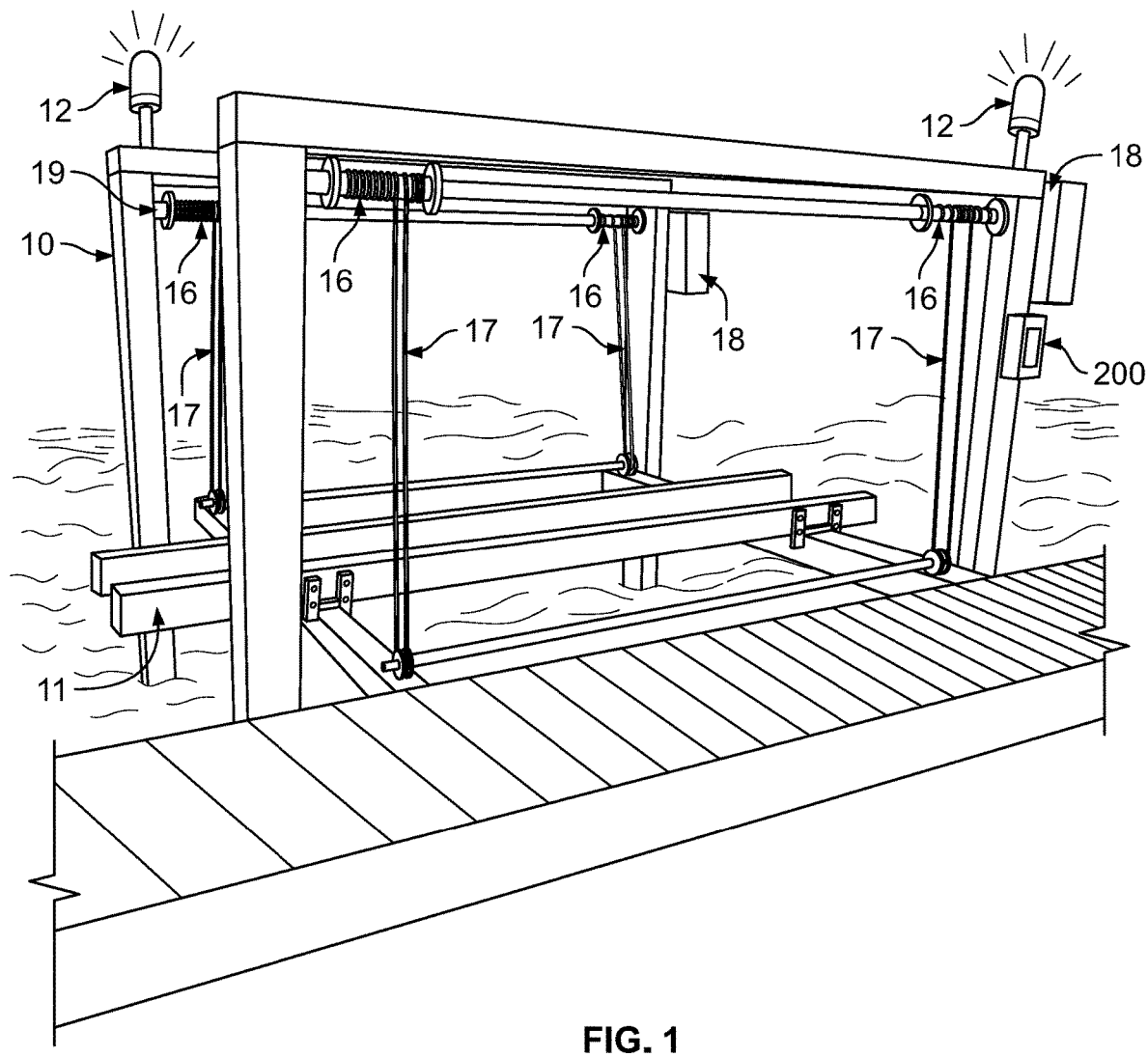
FIG. 1 illustrates a boat lift, according to embodiments herein.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings.

DETAILED DESCRIPTION

Embodiments of a boat lift control system include a controller that is physically connected to portions of the boat lift, via cables, wires, fastening devices, or the like. The controller may be mounted proximate to or on the boat lift. The control system further includes at least one remote controller, which causes the controller to take various actions. The control system may optionally include a communications network, such as the Internet, wireless, and cellular networks. The remote and/or the controller may communicate with the network. The remote may include a mobile device and software (for example, including an app) executing thereon. The remote may communicate directly with the controller and/or through the network.

Figure 2A:
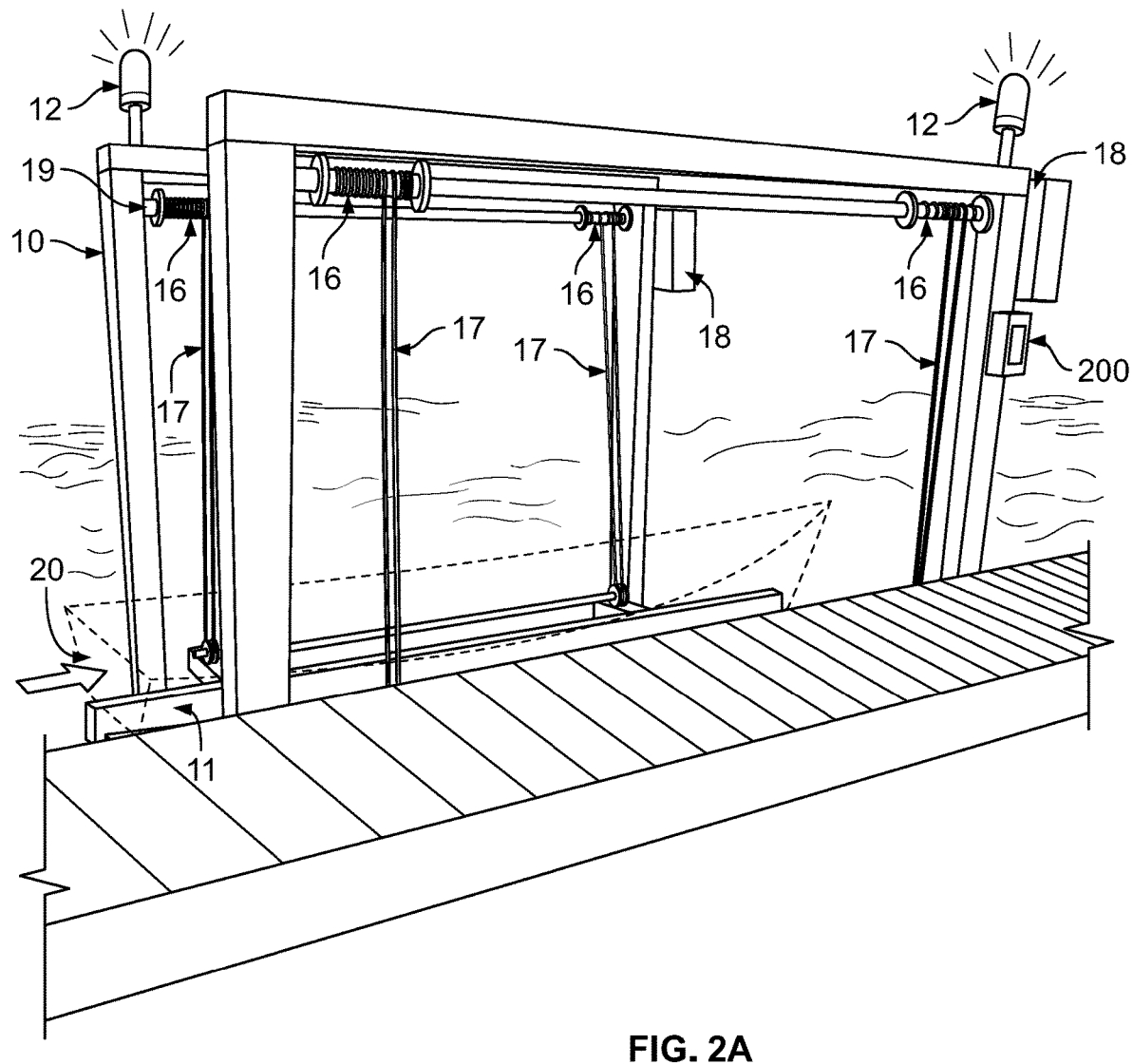
FIG. 2A shows a boat loaded into a boat lift, according to embodiments herein.
Figure 2B:
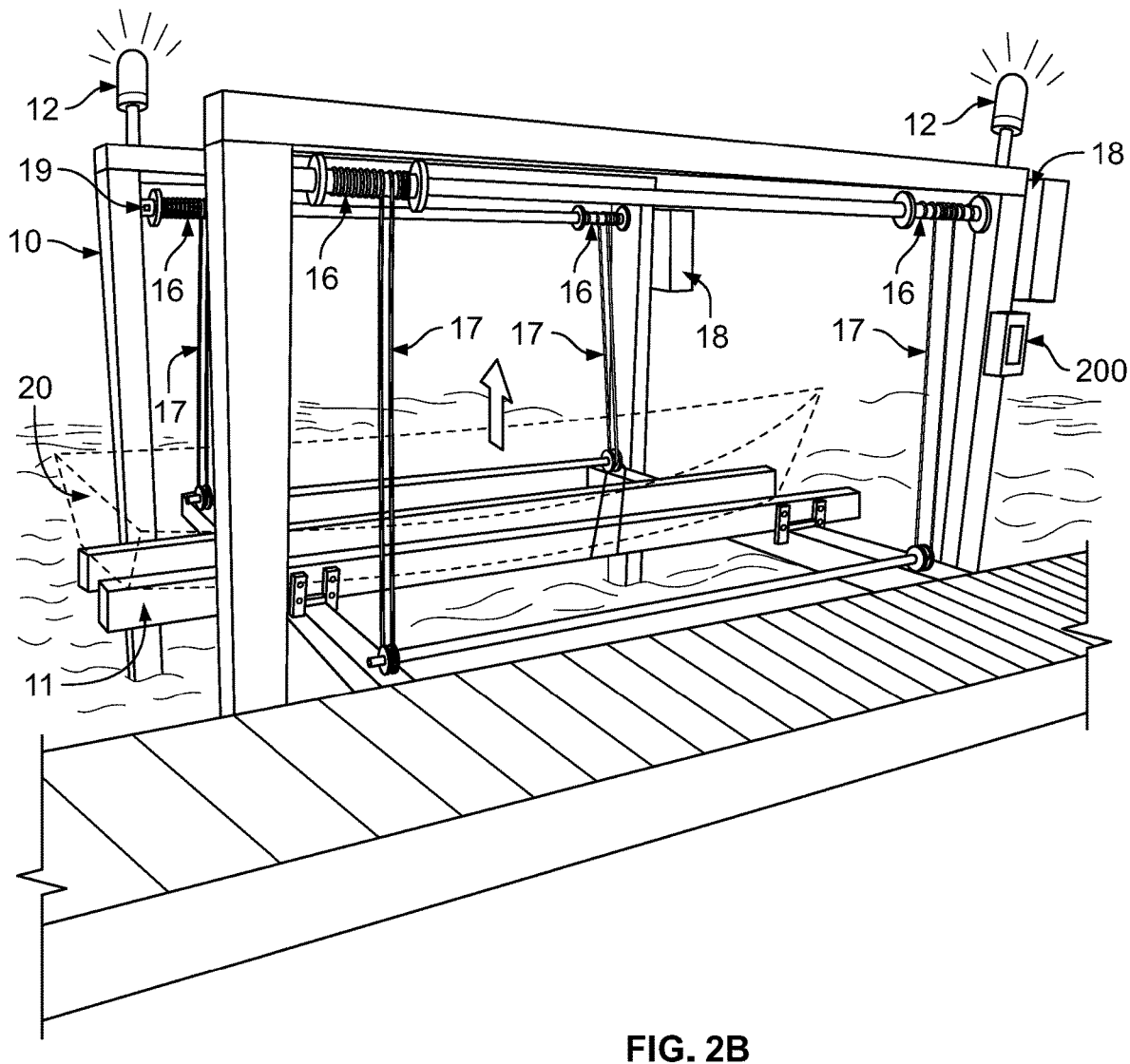
FIG. 2B shows a boat lifted by a boat lift, according to embodiments herein.

FIG. 1 illustrates boat lift 10 according to embodiments herein. FIG. 2A shows boat 20 loaded into boat lift 10, according to embodiments herein. FIG. 2B shows boat 20 lifted out of the water by boat lift 10, according to embodiments herein. Boat lift 100 may include a plurality of lights 12, platform 11, spools 16, cables 17, motors 18, and limit switch 19.

Platform 11 may receive the boat and be supported by cables 17 (e.g., four cables 17 engaged with four corresponding pulleys as shown). Cables 17 may be spooled/unspooled onto corresponding spools 16. Spools 16 may be rotated clockwise and counterclockwise by motors 18 (e.g., to spool and unspool cables 17). As shown, there are two motors 18, each connected to a shaft that is coupled to two spools 16. In this way, one motor 18 controls the rotation of two spools 16, although one motor 18 may control only one spool 16 in different arrangements. In such a case, there may be four motors 18. In other configurations, there may be eight spools 16 controlled by four motors 18. Various other configurations of motors 18, spools 16, and cables 17 are considered. Lights 12 may be 120 VAC light circuits for the purpose of illumination of area around the lift, dock, and water. There may be three lights 12, each individually controllable and rated for up to 800 W per circuit.

Controller 200 interacts with lights 12 and motors 18 to control boat lift 10. The function of controller 200 will be further described below. Limit switch 19 may be weather-sealed gear-reduction mechanisms with two micro switches actuated by adjustable cam levers. This may allow for the desired maximum and minimum height of platform 11 to be set during installation. Controller 200 may receive input from limit switch 19 to determine when to stop motors 18 (e.g., when platform 11 or boat 20 has reached the desired maximum and/or minimum elevations).

Figure 3:
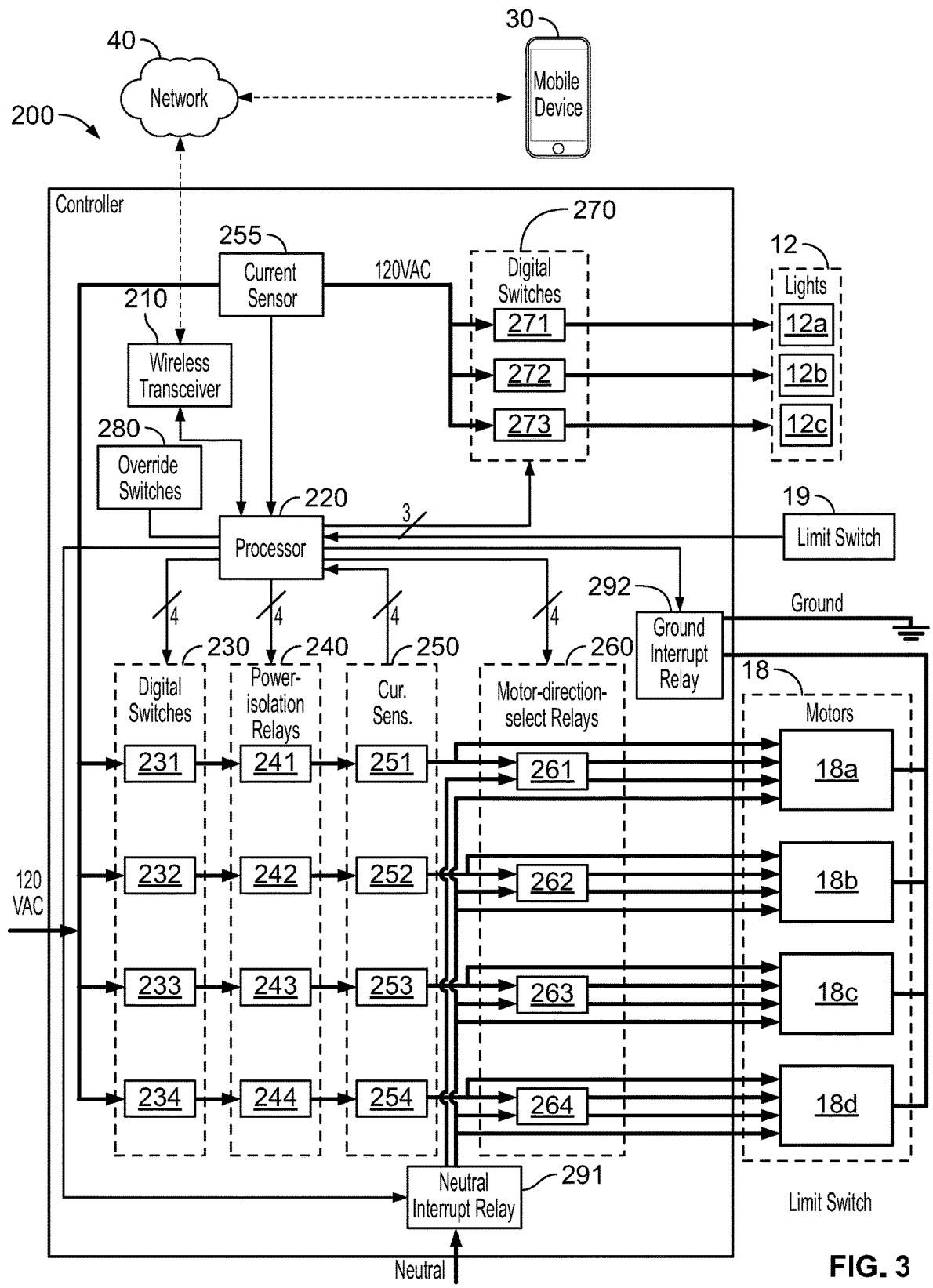
FIG. 3 shows a block diagram of a system including a boat lift controller and a mobile device, according to embodiments herein.

FIG. 3 shows a block diagram of boat lift 10 including controller 200 and mobile device 30, according to embodiments herein. FIGS. 5A, 5B, 5C, 5D, and 5E show electrical schematics of boat lift controller 200, according to embodiments herein. As will be understood, components in the electrical schematics may correspond to blocks in the block diagram of FIG. 3. The components in the electrical schematics are labeled with part numbers, and the datasheets for the electrical part numbers are incorporated by reference in their entireties, herein. Mobile device 30 (e.g., phone, tablet, laptop, or the like) may execute an application that communicates with controller 200 via network 40 to control and monitor operations of boat lift 10. Mobile device 30 may include a non-transitory medium that stores a set of instructions executable by a processor to perform the functions described herein. Mobile device 30 may communicate through a wired and/or wireless network 40 with wireless transceiver 210 in controller 200, which may receive one or more various types of wireless communications signals, such as cellular, WiFi, Bluetooth, or the like. An example of a wireless transceiver 210 is an Espressif Systems ESP32-WROOM-32U module which contains a Dual-core 240 Mhz 32-bit processor, 802.11 b/g/n WiFi interface, Bluetooth v4.2 and BLE, 4 MB RAM, plus SPI and UART interfaces as well as digital and analog input/outputs. Wireless transceiver 210 further communicates with processor 220 in controller 200, such that information can be exchanged between processor 220 and mobile device 30. The processor may be an 8-bit microprocessor that has 64K bytes of Flash memory for program storage and 4K of RAM. An example of a processor 220 is STMicroelectronics STM8L151U8C3.

Transceiver 210 may function as a communications controller in IoT (Internet of Things) devices. Transceiver 210 may include multiple communications and input/output pins for sending and receiving local data and processes network communications protocols via on-board microprocessor. Transceiver 210 may be in a module that is placed on a PCB and may communicate locally to sensors, processor 220, and wirelessly.

Controller 200 may further include digital switches 230 (231, 232, 233, and 234), power-isolation relays 240 (241, 242, 243, 244), current sensors 250 (251, 252, 253, 254), current sensor 255, motor-direction-select relays 260, digital switches 270, override switches 280, neutral-interrupt relay 291, and ground-interrupt relay 292. Controller 200 may control the states of motors 18 (18a, 18b, 18c, and 18d) and lights 12 (12a, 12b, 12c). Further, controller 200 may receive input from limit switch(es) 19 (one shown).

Power to each light 12a, 12b, 12c is controlled by a corresponding digital switch 271, 272, 273, which may be solid-state relays. An example of a digital switch 270 is WeEn Semiconductors BT137S Triac. It may also be possible to use electromechanical relays to control lights 12a, 12b, 12c. As shown, each digital switch 271, 272, 273 is individually controlled (turned ON/OFF) by processor 220. It may also be possible to control the switches 270 together (e.g., with one control signal). Each digital switch 271, 272, 273 receives high voltage (e.g., 120 VAC) and selectively passes it to a corresponding light 12a, 12b, 12c per the state of the control signals from processor 220. The current flowing into the collection of digital switches 270 may be sensed by current sensor 255. In turn, current sensor 255 may communicate a signal corresponding to the sensed current to processor 220. Current sensor 255 may be resistive or magnetic or use other technology. An example of current sensor 255 is Analog Devices ACS730KLCTR-40AB, 40A single channel Hall Effect sensor. Instead of one current sensor 255 measuring the sum of currents to lights 12a, 12b, 12c, multiple current sensors may be used to measure current being supplied to an individual light. In such a scenario, the current sensors may be positioned between digital switches 271, 272, 273 and lights 12a, 12b, 12c. Processor 220 may evaluate the sensed current signal from current sensor 255, and take a responsive action. For example, if processor 220 is signaling digital switch 271 to be ON and current sensor 255 senses an unusually high current, processor 220 may recognize a short circuit condition and turn OFF digital switch 271. As another example, if processor 220 is signaling digital switch 271 to be ON and current sensor 255 senses no current, the processor 220 may recognize that a bulb in light 12a may be burned out or removed. In such a case, processor may again turn OFF digital switch 271 for safety reasons. In any event, processor 220 may communicate with mobile device 30 to indicate to a user the sensed condition and/or any responsive actions taken. While digital switches 270 are shown as switching a high voltage to lights 12, digital switches 270 may also or optionally switch neutral to lights 12.

Digital switches 230 may be solid-state relays. According to one example, a digital switch 230 may include triacs, such as two triacs in parallel. Such triacs may be 12 A triacs, and may be arranged in parallel to increase current capacity supplied to a corresponding motor 18. Each digital switch 230 may include an opto-isolator driver for switching from the microcontroller low voltage DC signal to high voltage AC triac(s) inputs. An example of a digital switch 230 may include Lite-On Inc. MOC3021S (opto-isolator) and STMicroelectronics ACST1210 (Triac). Digital switches 230 may receive high voltage input, although it may also be possible to switch neutral through the control path to corresponding motors 18. Digital switches 230 may be individually controlled by processor 220, as shown. Processor 220 may control an individual digital switch 230 (or the group of digital switches 230 or any subset thereof, e.g., pairs of relays on a given side of boat lift 10) to cause the input voltage to be provided at the output of said digital switch 230.

Power-isolation relays 240 may be electromechanical relays, such as single-pole, single-throw relays. Such power-isolation relays 240 may be rated for 16 A. Power-isolation relays 240 may also be digital relays, such solid-state relays. An example of a power-isolation relay 240 is TE Schrack RZ03-1A4-D012. Power-isolation relays 240 may receive a voltage from the outputs of digital switches 230. Power-isolation relays 240 may receive high voltage input, although it may also be possible to switch neutral through the control path to corresponding motors 18. Power-isolation relays 240 may be individually controlled by processor 220, as shown. Processor 220 may control an individual power-isolation relay 240 (or the group of power-isolation relays 240 or any subset thereof, e.g., pairs of relays on a given side of boat lift 10) to cause the input voltage to be provided at the output of said power-isolation relay 240.

Motor-direction-select relays 260 may be electromechanical or solid-state relays. Motion-direction-select relays 260 may switch high voltage and/or neutral to motors 18. Each motion-direction-select 260 may be a multi-pole, multi-throw relay (e.g., a double-pole, double-throw relay). A motor-direction-select relay 260 may be rated for 8 A per contact. An example of a motor-direction-select relay 260 is TE Schrack RT42012WG. Motor-direction-select relays 260 may be individually controlled by processor 220, as shown. Processor 220 may control an individual motor-direction-select relay 260 (or the group of motor-direction-select relays 260 or any subset thereof, e.g., pairs of relays on a given side of boat lift 10) to cause the input voltage(s) to be provided at the output of said motor-direction-select relay 260. Depending on the state of a given motion-direction-select relay 260, the output(s) may be switched to cause the shaft of a corresponding motor 18 to rotate clockwise or counterclockwise. Each pole of the relay may reversed such that, on pole A, the NC (Normally Closed) contact is HOT and pole B is Neutral, and the NO (Normally Open) contact on pole A is Neutral and on pole B is HOT. Changing the state of the relay contacts of the motor-direction-select relay 260 will cause the output contacts to switch from contact A being HOT and contact B being Neutral to contact A being Neutral and contact B being HOT.

Current sensors 250 may sense current flowing to respective motors 18, and may be located anywhere along a path in which current flows to motors 18, whether that path is high-voltage or neutral. The current sensors may be Hall Effect sensors sensitive from 0 A to +/−40 A with an output signal of 50 mV/Amp. An example of a current sensor 250 is Analog Devices ACS730KLCTR-40AB, 40 A single channel Hall Effect sensor. As shown, current sensors 250 are positioned between power-isolation relays 240 and motor-direction-select relays 260. Signals from current sensors 250 are routed to processor 220. As will be further discussed, processor 220 may take responsive actions based on the value of a given current sensor 250 signal. Current sensors 250 can also detect changes in the system over time. For example, if the flow of current decreases, that could indicate increased resistance at mechanical contactor relays. Such a condition could be a precursor to relay failure. Processor 220 could then cause a message to be sent to mobile device 30 alerting a user of this condition. As another example, a change in expected current can indicate an issue with a load, such as a motor or lamp. Processor 220 can then cause a message to be sent to mobile device 30 alerting a user of this condition. By using a separate current sensor 250 in each motor-switching path, processor 220 may adjust how each motor 18 is individually controlled and/or narrow down the location of a problem or fault or a potential problem or fault.

Rather than powering all motors 18 at once (e.g., using a single electromechanical contactor, such as a high-current multi-pole relay), power to motors 18 can be controlled on an individual basis. This may allow for separate control of each motor 18. It may also allow for processor 220 to identify problems or potential problems with a given motor 18 and/or switching path for the given motor 18. Motor 18*a* may be controlled by processor 220, digital switch 231, power-isolation relay 241, current sensor 251, and motor-direction-select relay 261. Motor 18*b* may be controlled by processor 220, digital switch 232, power-isolation relay 242, current sensor 252, and motor-direction-select relay 262. Motor 18*c* may be controlled by processor 220, digital switch 233, power-isolation relay 243, current sensor 253, and motor-direction-select relay 263. Motor 18*d* may be controlled by processor 220, digital switch 234, power-isolation relay 244, current sensor 254, and motor-direction-select relay 264. As will be further discussed, motors 18 may also be controlled by neutral-interrupt relay 291 and ground-interrupt relay 292.

Figure 5A:
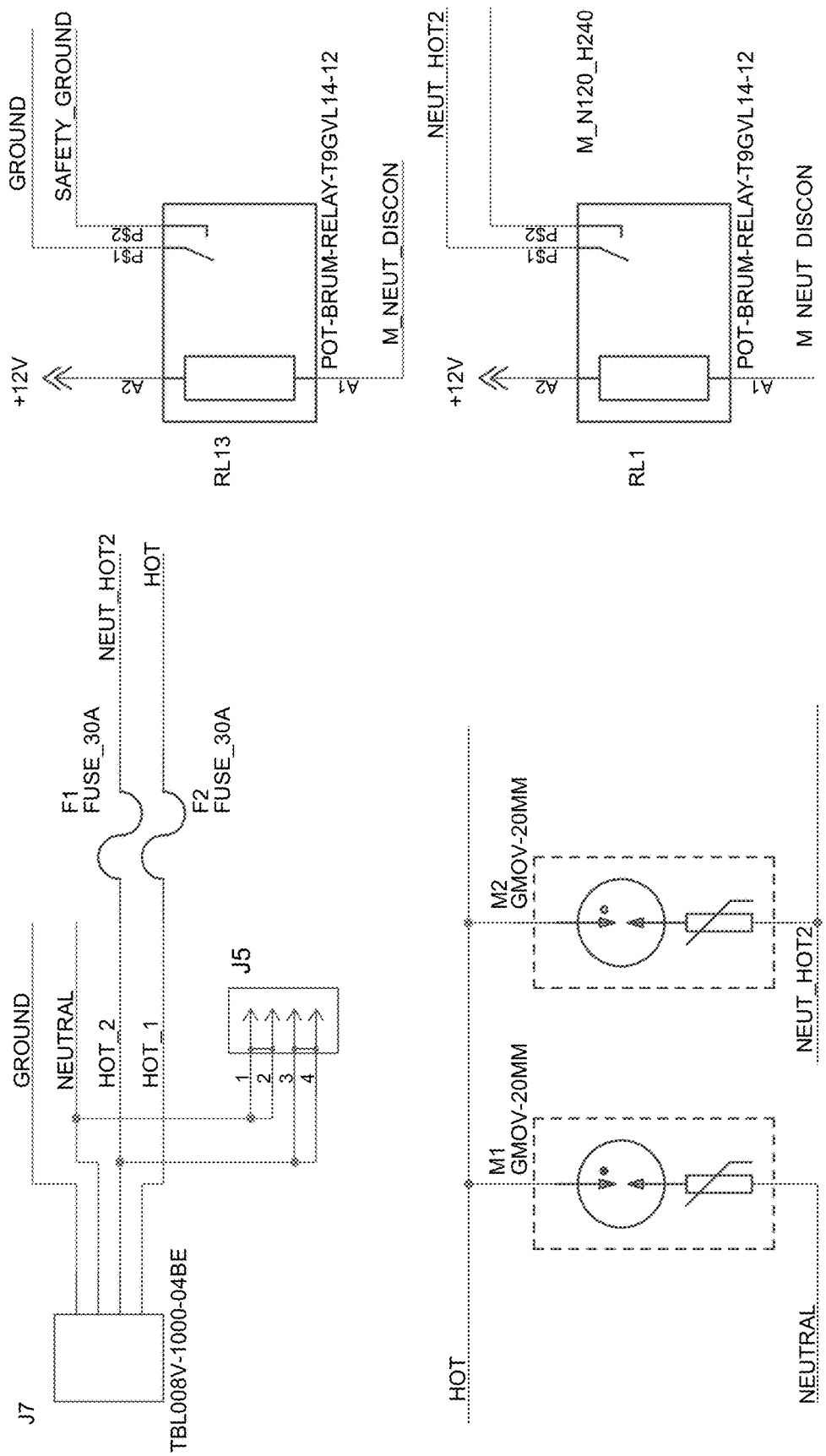

Neutral-interrupt relay 291 may be a Potter-Brumfield T9GV1L-12. Neutral-interrupt relay 291 may be controlled by processor 220. Neutral-interrupt relay 291 may receive neutral at the input and selectively provide neutral to motor-direction-select relays 260 and/or motors 18 (delivery of neutral to both motor-direction-select relays 260 and motors 18 is shown in FIG. 3 and corresponding circuit schematics). Each motor 18 may be connected to a neutral wire, which is also connected to controller 200. The point of connection of the neutral wire to controller 200 is shown in FIGS. 5A and 5E as "L2 (ORANGE)." Controller 200 may electrically connect that neutral wire to another conductor that is connected to neutral at the AC input of controller 200. Further, controller 200 may have a neutral-interrupt relay 291 (e.g., RL1) that selectively electrically connects the neutral wire from motor to neutral. When the motors 18 are not energized, the neutral path can be broken through control of the neutral relay (RL1) by the processor.

Ground-interrupt relay 292 may be a Potter-Brumfield T9GV1L-12. Ground-interrupt relay 292 may be controlled by processor 220. Ground-interrupt relay 292 may receive neutral at the input and selectively provide ground to motors 18. Controller 200 may reduce damage to motors 18 due to, for example, galvanic corrosion. Each motor 18 may be connected to a grounding wire (safety ground), which is also connected to controller 200. Although this connection may involve an additional installation step, it may permit controller 200 to extend the life of the motor. The point of connection of the grounding wire to controller 200 is shown in FIGS. 5A and 5E as "GROUND (GREEN)." Controller 200 may electrically connect that grounding wire to another conductor that is connected to ground. Controller 200 may have a ground-interrupt relay 292 (e.g., RL13) that selectively electrically connects the grounding wire from motors 18 to ground. When motors 18 are not energized, the ground path can be broken through control of ground-interrupt relay 292 by processor 220.

Breaking the ground path and/or neutral path during periods when motors are not operating may reduce or eliminate problems due to galvanic corrosion at motors 18. Breaking these paths may also reduce or eliminate such problems within controller 200 (e.g., galvanic corrosion at mechanical relay contacts and wiring terminals).

Limit switch 19 may be a TER (Tecno Elettrica Ravasi) PFA9067A0050001 Weather-proof (IP67) Rotary Limit Switch with 50:1 gear-reduction cam with two microswitches. A signal from limit switch 19 may be provided to processor 220, which may take responsive action as further described.

Override switch(es) 280 may be one or more switches that can receive a local user's finger to control boat lift 10. Override switches 280 may be located within or outside of a housing of controller 200 that houses other components, such as other circuitry described herein. Override switches 280 may be mechanical or digital switches. An example of an override switch 280 may be a SPST-NO top actuated PCB mount pushbutton C&K Tactile Switch PTS647SK38SMT-2LFS. Override switches 280 may be sensed by processor 220, and responsive action may be taken by processor 220 when a state of override switches 280 occurs. For example, there may be two override switches 280—one to raise platform 11 and one to lower platform 11 Another example of an override switch 280 is an emergency stop button, which causes movement of platform 11 and motors 18 to immediately stop. Other examples of override switches 280 are switches to control lights 12 (either individually or collectively). Processor 220 may take responsive action in response to a change in state of a given override switch 280 regardless of the state of mobile device 30 or controller 200.

Figure 6A:
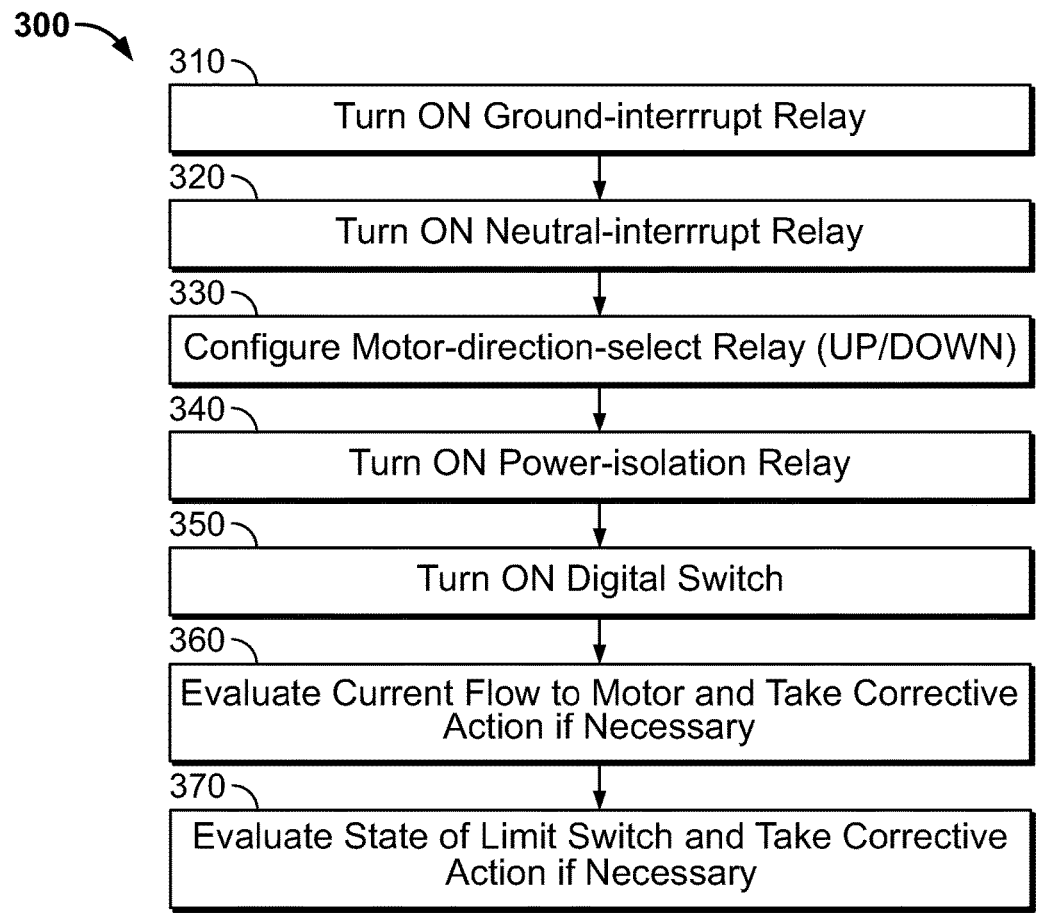
FIG. 6A shows a flow chart for a method of activating boat lift motors, according to embodiments herein.

FIG. 6A shows a flow chart 300 for a method of activating boat lift motors, according to embodiments herein. The method may be performed with a system, such as that shown herein, and will be described as such, although the method may be performable with other systems. Processor 220 may cause the method to take place. Processor 220 may execute a set of machine-readable instructions stored on a memory, such as flash, ROM, RAM, EEPROM, etc. Such instructions may define how the method is performed. The following example of how motor 18*a* may be controlled may also apply similarly to how motors 18*b*, 18*c*, and 18*d* may be controlled. For the sake of brevity and clarity, the discussion will not be repeated for each motor 18 control operation.

At step 310, ground-interrupt relay 292 may be switched ON by processor 220. At this time, motor 18*a* may be connected to ground. Prior to this step, when motor 18*a* is not connected to ground, Galvanic Corrosion may be mitigated. Galvanic Corrosion is corrosive damage induced when two (or more) dissimilar materials are coupled in a corrosive electrolyte. This occurs when two different materials (such as steel and aluminum) are joined in electrical contact, under, or near salt water. By disconnecting both the power, the neutral and earth ground paths, the source of the "electrical contact" element of the corrosion may be removed.

At step 320, neutral-interrupt relay 291 may be switched ON by processor 220. At this time, motor 18*a* may be connected to neutral. Prior to this step, when motor 18*a* is not connected to neutral, Galvanic Corrosion may be mitigated. Neutral will also be provided to an input of motor-direction-select relay 261 after neutral-interrupt relay 291 is switched ON.

At step 330, motor-direction-select relay 261 may be configured (switched) by processor 220. Depending on the state of motor-direction-select relay 261, different combinations of voltages will be outputted and supplied to motor 18*a* after step 350. In one scenario, the input voltage is 120 VAC. Motor 18*a* may be wired with Red and White wires. When motor-direction-select relay 261 is OFF, Red is 120 VAC and White is Neutral. When motor-direction-select relay 261 is ON, Red is Neutral and White is 120 VAC. In another scenario, the input voltage is 240 VAC. Motor 18*a* may be wired with Red and White wires. When motor-direction-select relay 261 is OFF, Red is 240 VAC and White is Neutral. When motor-direction-select relay 261 is ON, Red is Neutral and White is 240 VAC.

At step 340, power-isolation relay 241 may be switched ON. Prior to switching power-isolation relay 241 ON, processor 220 may confirm digital switch 251 has been switched OFF. When power-isolation relay 241 has mechanical contacts, it may be beneficial to prevent power from being applied to the input of power-isolation relay 241 when it is switched ON. This may prevent undesirable arcing between the input and output contacts on power-isolation relay 241. Arcing may cause damage to the contacts, which may ultimately lead to failure due to high impedance (e.g., degraded contact material) or poor contact between the contacts. It may be preferable to supply power to the input of power-isolation relay 241 only after it has been switched to the closed position.

At step 350, digital switch 251 may be switched ON. After power-isolation relay 241 has been closed, digital switch 251 may be switched ON to supply power to the input of power-isolation relay 241. At this time, motor 18*a* will begin to operate. Power will be supplied from the high-voltage input to the controller 200 through digital switch 231 and power-isolation relay 241. Further, neutral will be provided to motor 18*a*. Additionally, motor-direction-select relay 261 will be receiving and providing the desired voltages to motor 18*a* to cause it to rotate the motor shaft clockwise or counterclockwise, thereby causing the platform 11 to rise or fall.

At step 360, current flow to motor 18*a* may be evaluated with current sensor 251 while motor 18*a* is operating (or intended to be operating). Current sensor 251 may provide a signal corresponding to the amount of measured current to processor 220. Processor 220 may evaluate the signal provided by current sensor 251, and take responsive action as necessary. For example, if there is excessive current (e.g., caused by a short or failure of motor 18*a*), processor 220 may interrupt power being supplied to motor 18*a*. Power may be interrupted in a manner similar to that described in context of FIG. 6B. As another example, if the current is too low, processor 220 may recognize that there is a problem with motor 18*a* or controller 200. Power may be interrupted in a manner similar to that described in context of FIG. 6B. In any event processor 220 may cause a message to be delivered to mobile device 30 to alert the operator of an issue with current flow. Further, processor 220 may cause a message to be delivered to mobile device 30 that motor 18*a* is operating correctly.

At step 370, the signal from limit switch 19 may be evaluated by processor 220, which may take responsive action as necessary. Limit switch 19 may be normally closed. When the contacts in limit switch 19 open (activate), then the output signal from limit switch 19 changes from low (e.g., 0V) to high (e.g., 12V) signifying that the limit is reached, thus the motor 18*a* is turned OFF by processor 220. There may be two limit switches 19—one for the UP position and one for the DOWN position. If motor 18*a* is rotating to cause platform 12 to move UP, then the DOWN position limit switch 19 may be ignored by processor 220. Likewise, if motor 18*a* is rotating to cause platform 12 to move DOWN, then the UP position limit switch 19 may be ignored by processor 220. Power may be interrupted in a manner similar to that described in context of FIG. 6B.

Further, processor 220 may cause a message to be delivered to mobile device 30 that the platform 11 has been fully raised or lowered to its limits.

Controller 200 may also stop the direction of travel of platform 11 without inputs from limit switch(es) 19. Controller 200 may enable boat lift 10 to function without limit switches 19 at all while still limiting the range of motion of platform 11 to both a maximum and minimum. Limit switches 19 may add cost (parts, difficult installation that must be performed by an electrician, maintenance, etc.) and complexity to boat lift 10, and may be potential points of failure. Controller 200 described herein may eliminate the need for limit switches 19. Controller 200 may, mobile device 30 or other user interface apart from controller 200, enable the operator to adjust the minimum/maximum elevation limits. The operator may also selectively bypass these limits, allowing platform 11 to travel beyond its normal vertical range. For example, the operator may be able move platform 11 beyond the upper limit without the assistance of an electrician or otherwise requiring adjustment of limit switches 19 via manual labor. This may be helpful during inclement weather.

Figure 4:
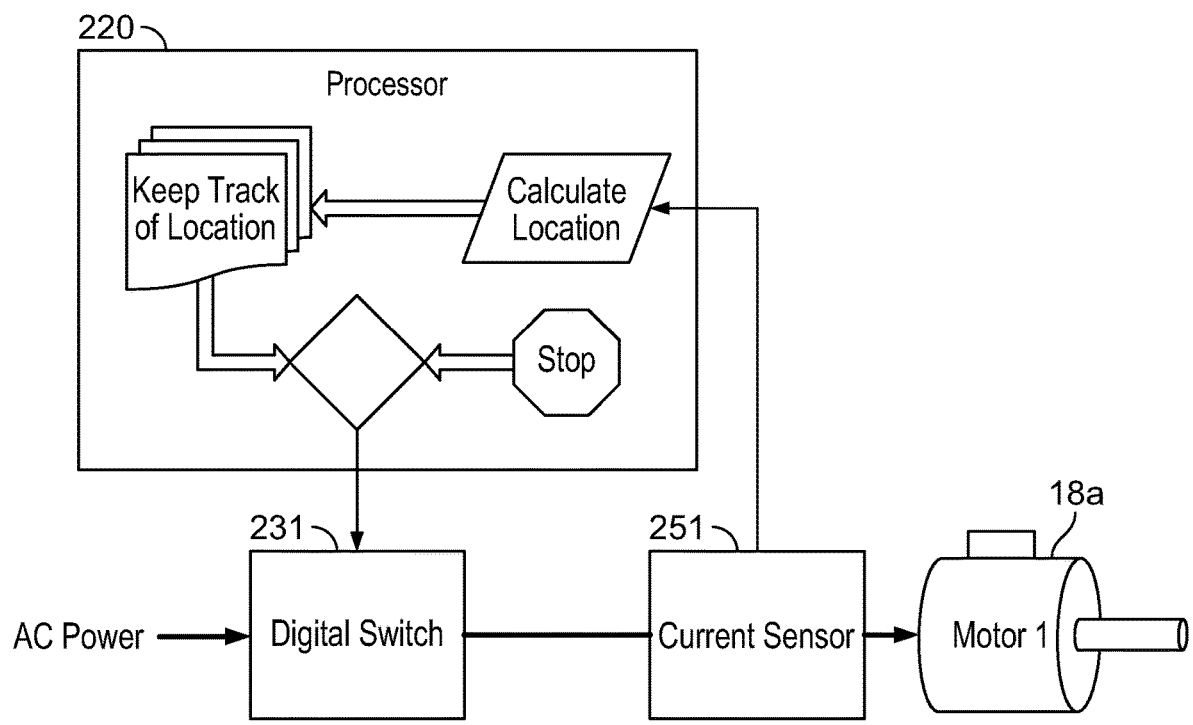
FIG. 4 shows a block diagram of a system and flow chart for stopping a boat lift motor, according to embodiments herein.

Instead of, or in combination with limit switch 19, processor 220 may implement a virtual limit "switch"—e.g., execute a set of computer-readable instructions stored in a non-transient medium. Such an algorithm is depicted in FIG. 4, and may be implemented in combination with other (or additional) methods, such as those described in FIGS. 6A and 6B. During operation of motor 18*a*, processor 220 monitors current flow via current sensor 251. Processor 220 may be capable of determining when a full rotation of the shaft of motor 18*a* has occurred by evaluating current flow over time.

While the shaft is rotating, the amount of current drawn by motor 18*a* varies—e.g., the phase of motor 18*a* may change throughout one rotation. These current fluctuations corresponding to phase states can correlate with the position of motor 18*a*. Current may flow positively and negatively during each revolution, so by counting the number of transitions (e.g., observe sine waves), processor 220 may count the revolutions. Each revolution may correspond to a specific change in elevation of one corner of platform 11. After a certain number of revolutions are detected, processor 220 may infer that platform 11 has reached its maximum or minimum elevation. Such an inference may be based on empirical numbers (e.g., a measurement of how many revolutions it takes to raise/lower the platform to its full extents). Such an inference may also be made by assumptions about the radius of spool around which cable 17 spools. Therefore, processor 220 may infer the position of each corner of platform 11 by monitoring current flow. Through software (e.g., mobile device 30), upper and lower limits in the virtual limit switch algorithm can be set.

Once the inferred location reaches the maximum or minimum elevations, processor 220 may cause motor 18*a* to stop. For example, processor 220 may switch digital switch 231 OFF once a threshold has been reached. During operation of the virtual limit switch, processor 220 may cause messages to be transmitted to mobile device 30. Such messages may indicate to the operator whether platform 11 has reached its maximum or minimum elevation, or the current elevation of platform 11 (e.g., in terms of feet or percentage).

Figure 6B:
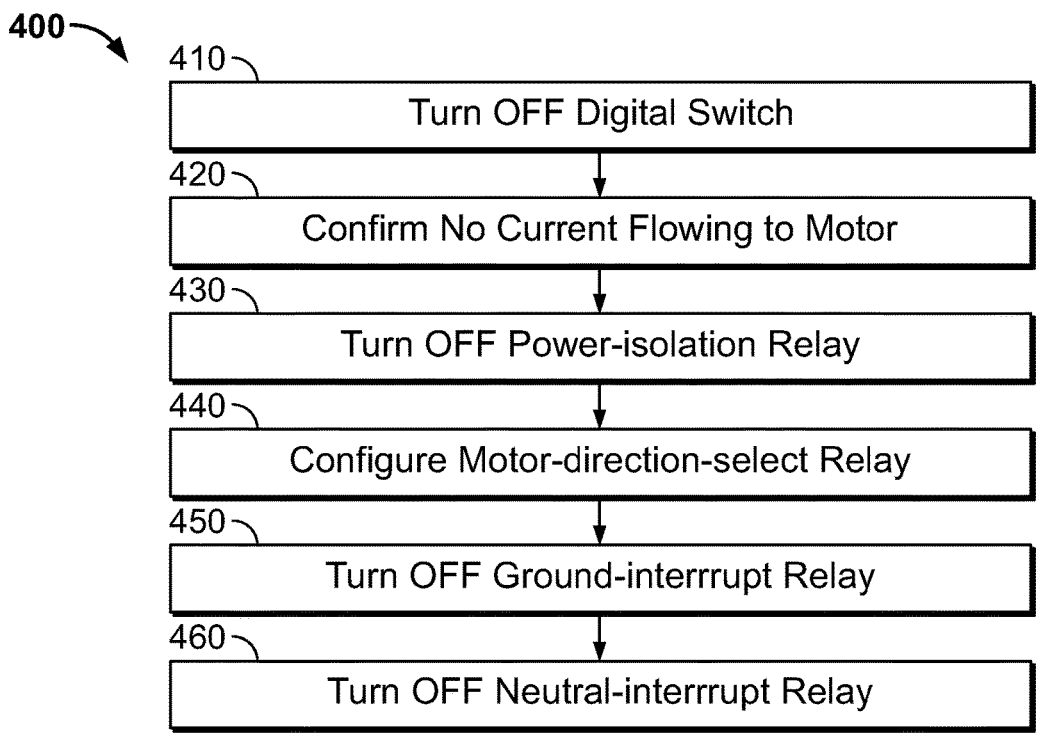
FIG. 6B shows a flow chart for a method of deactivating boat lift motors, according to embodiments herein.

FIG. 6B shows a flow chart 400 for a method of deactivating boat lift motors 18, according to embodiments herein. The method may be performed with a system, such as that shown herein, and will be described as such, although the method may be performable with other systems. Processor 220 may cause the method to take place. Processor 220 may execute a set of machine-readable instructions stored on a memory, such as flash, ROM, RAM, EEPROM, etc. Such instructions may define how the method is performed. The following example of how motor 18a may be controlled may also apply similarly to how motors 18b, 18c, and 18d may be controlled. For the sake of brevity and clarity, the discussion will not be repeated for each motor 18 control operation. The method of flow chart 400 may be executed when platform 11 has been raised/lowered to its maximum/minimum elevation (per limit switch 19 or virtual limit switch algorithm). The method may also be executed if there is a fault condition recognized by processor 220 (e.g., excessive current detected by a current sensor (e.g., current sensor 250), insufficient current (e.g., detected by current sensor 250), excessive temperature in controller 200 (e.g., detected by temperature sensor, which is not shown), excessive humidity (e.g., detected by humidity sensor, which is not shown), etc.).

At step 410, digital switch 231 may be switched OFF by processor 220. At step 420, processor 220 may confirm that no current is flowing to motor 18a, by monitoring the signal from current sensor 251. Steps 410 and/or 420 may be performed before power-isolation relay 241 is turned OFF at step 430. By removing power from the input to power-isolation relay 241, arcing may be prevented when the contacts are opened, thereby eliminating issues resulting therefrom. At step 440, motor-direction-select relay 261 may be configured. For example, if motor 18a was lowering platform 11, then motor-direction-select relay 261 may be switched such that it is configured to output voltages that will configure motor-direction-select relay 261 to cause motor 18a to raise platform 11. At step 450, ground-interrupt relay 292 may be switched OFF. At step 460, neutral-interrupt relay 460 may be switched OFF. The ground-interrupt relay 292 and/or neutral-interrupt relay 460 may be switched OFF after a period of time (e.g., 10 or more seconds) after the power has been shut off to motor 18a in order to allow any residual voltage or capacitance to bleed off.

FIGS. 5A, 5B, 5C, 5D, 5E, 5F, 5G, 5H, 5I, 5J, 5K, 5L, 5M, 5N, 5O, 5P, 5Q, and 5R show electrical schematics of boat lift controller 200, according to embodiments herein. As will be understood, components in the electrical schematics may correspond to blocks in the block diagram of FIG. 3. Originally filed FIG. 5A shows a power connector, jumper block for 120 VAC operation, neutral and safety ground disconnect relays, and motor drive circuitry. In Originally filed FIG. 5A, the motor drive circuitry for each of motors 1 and 2 is shown as including digital switch (with an opto-isolator and dual-Triacs), power-isolation relay, motor-direction-select relay, and current sensor. FIG. Originally filed 5E shows motor drive circuitry for each of motors 3 and 4 that is similar to the circuitry shown in Originally filed FIG. 5A.

Figure 5B:
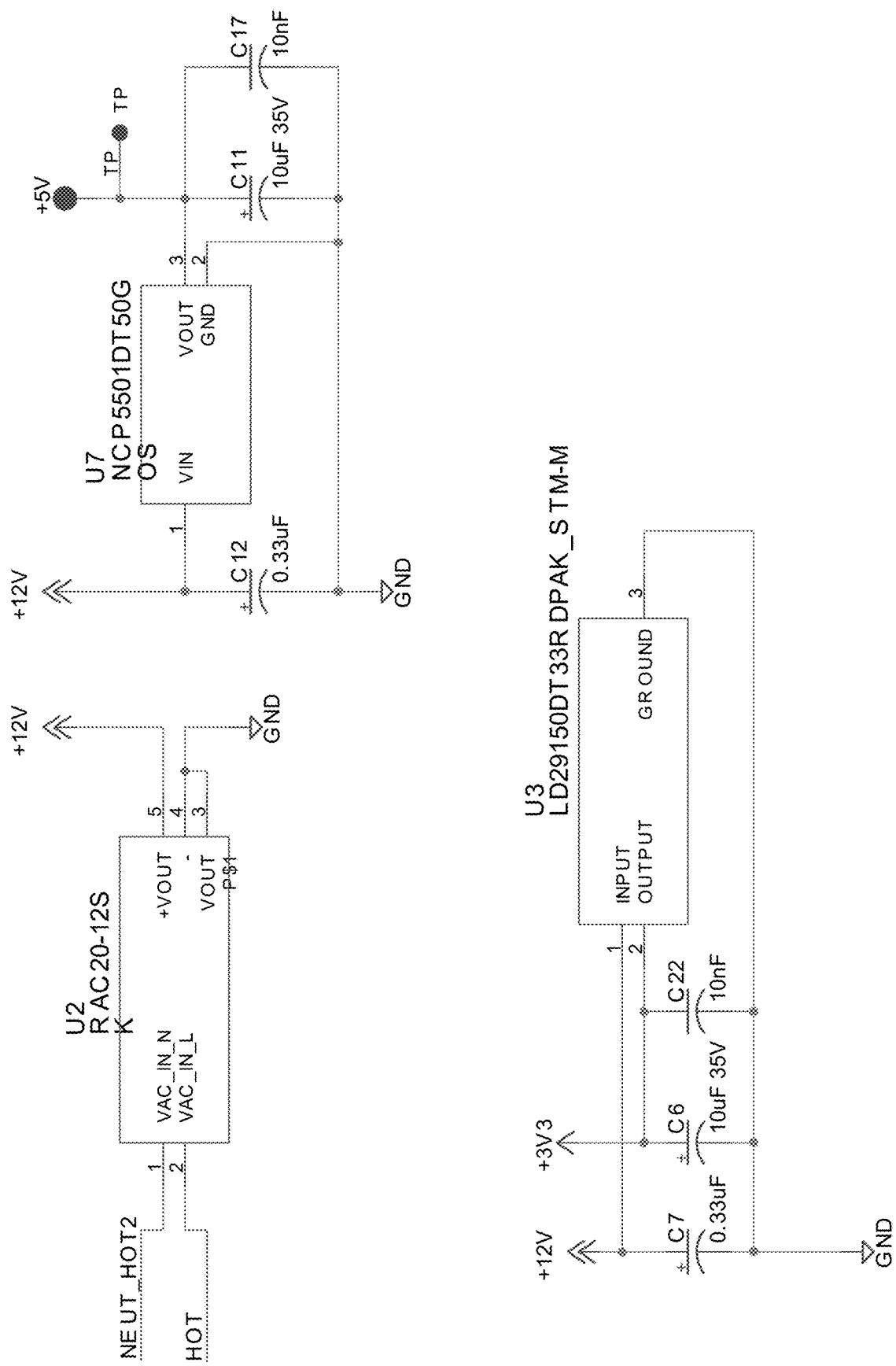
Figure 5C:
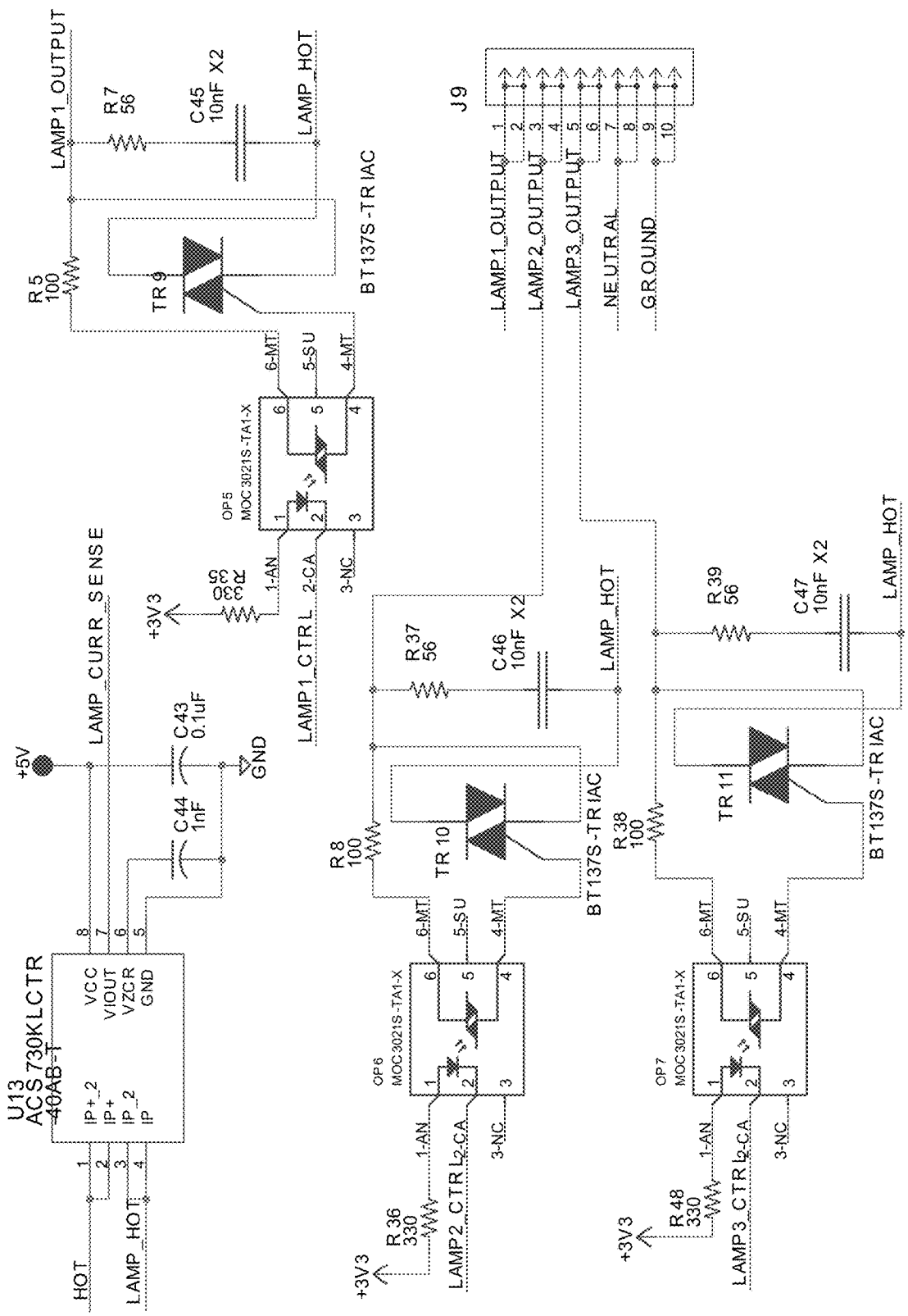
Figure 5D:
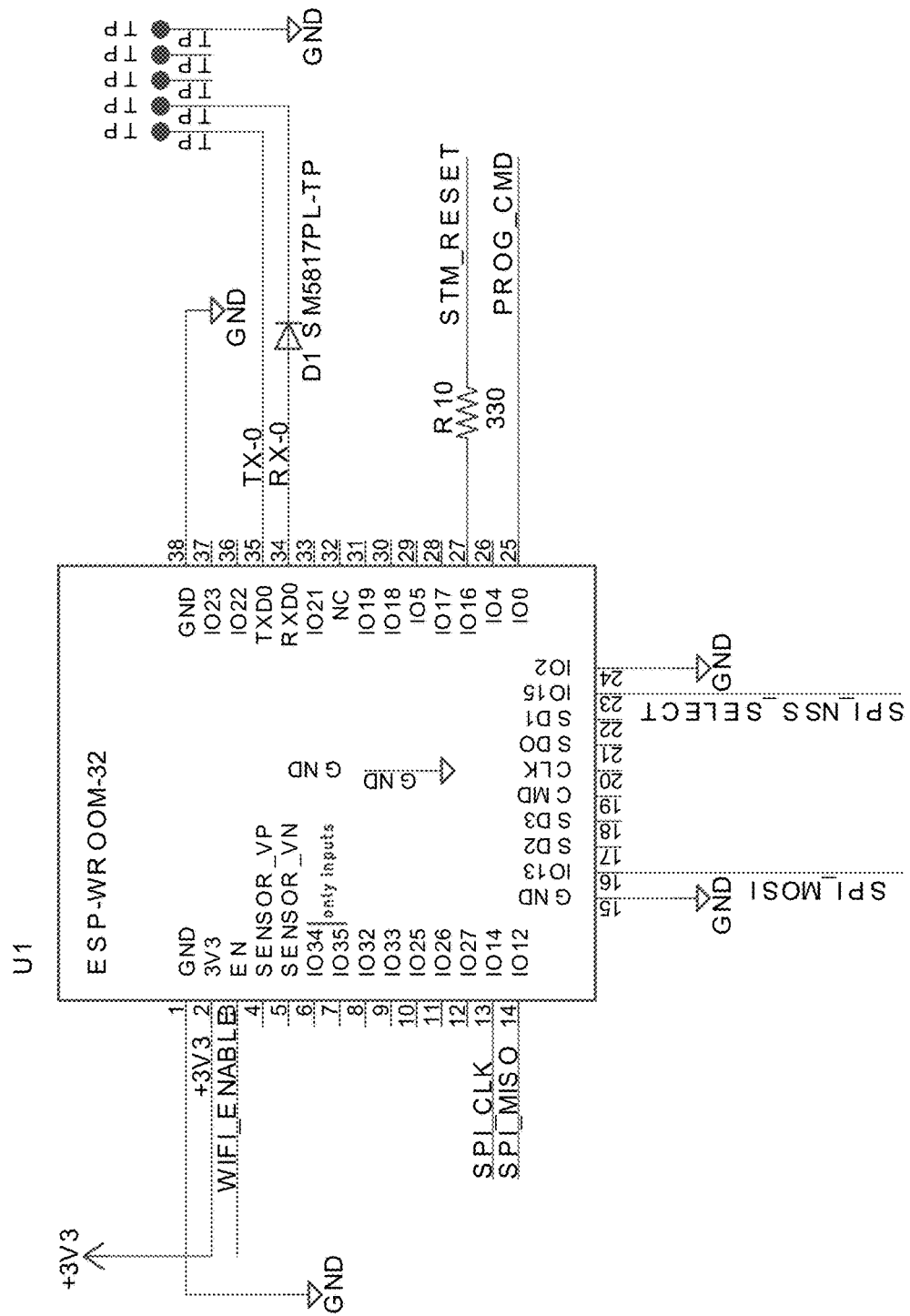
Figure 5E:
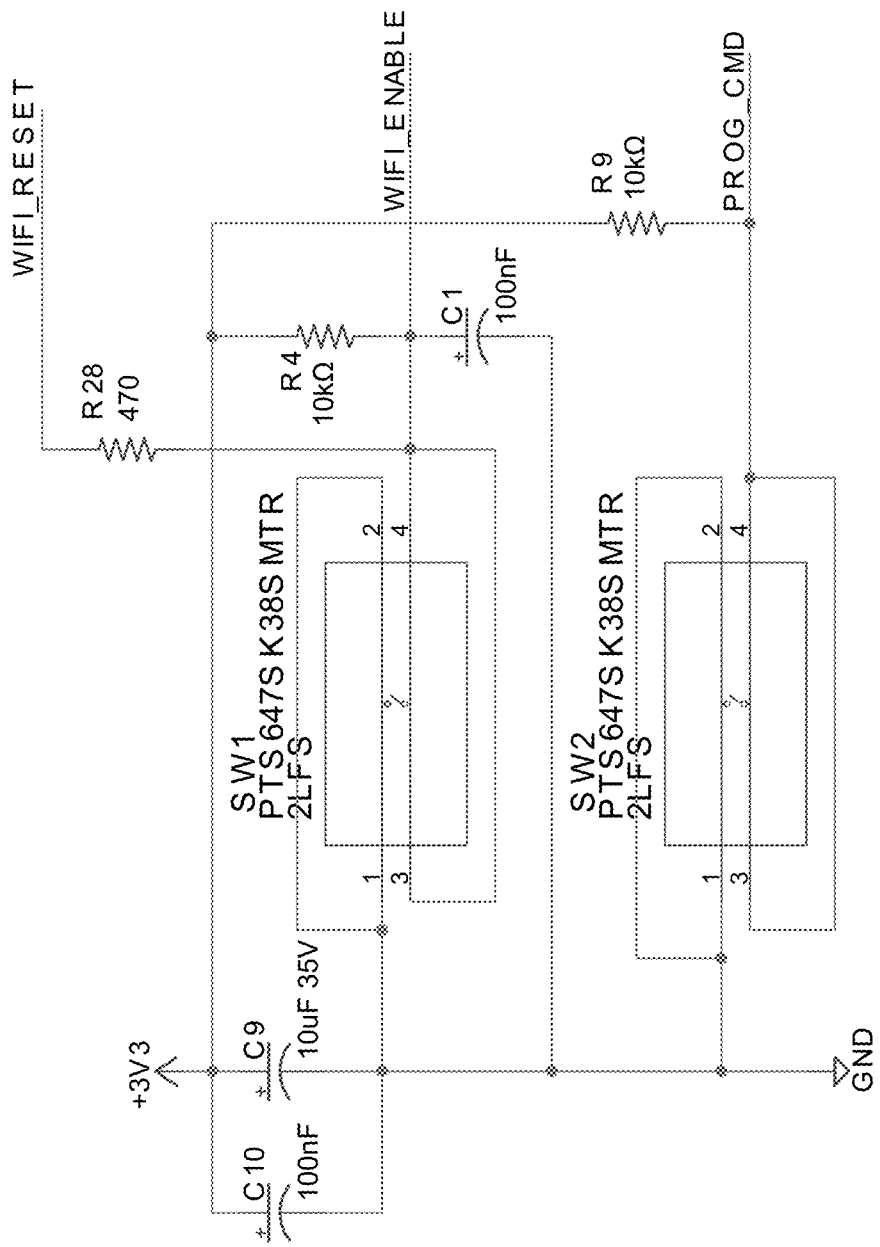
Figure 5F:
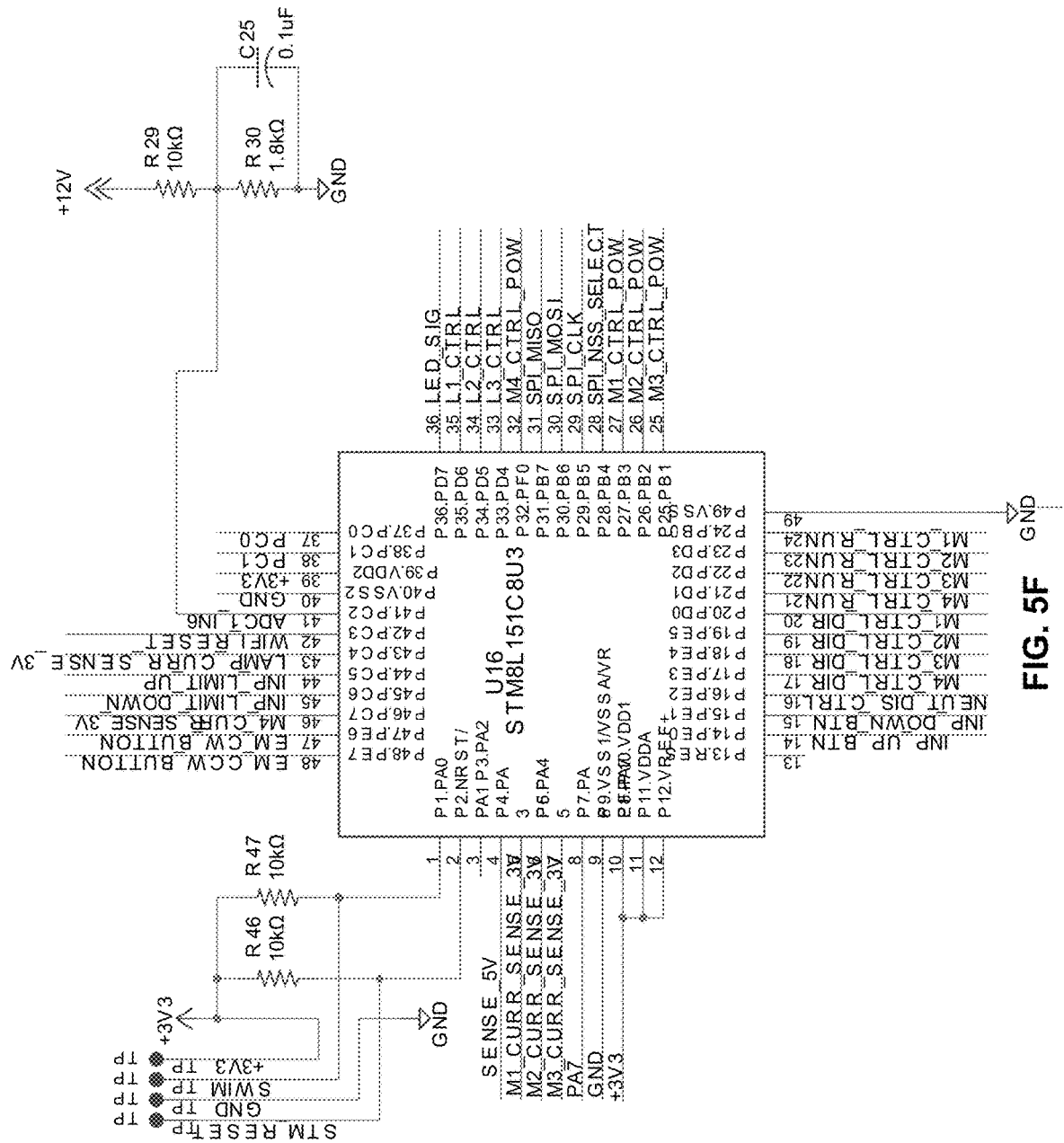
Figure 5G:
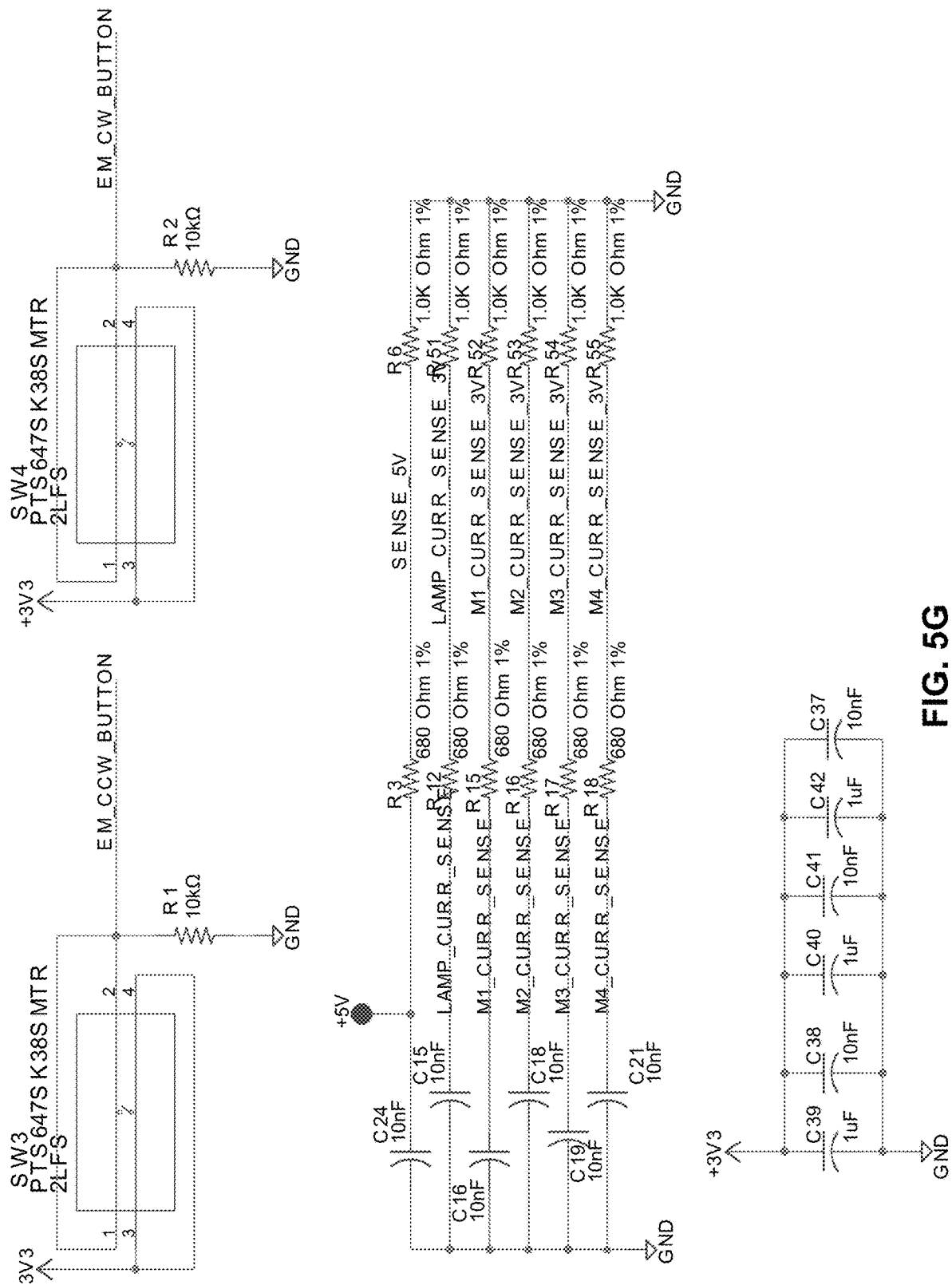
Figure 5H:
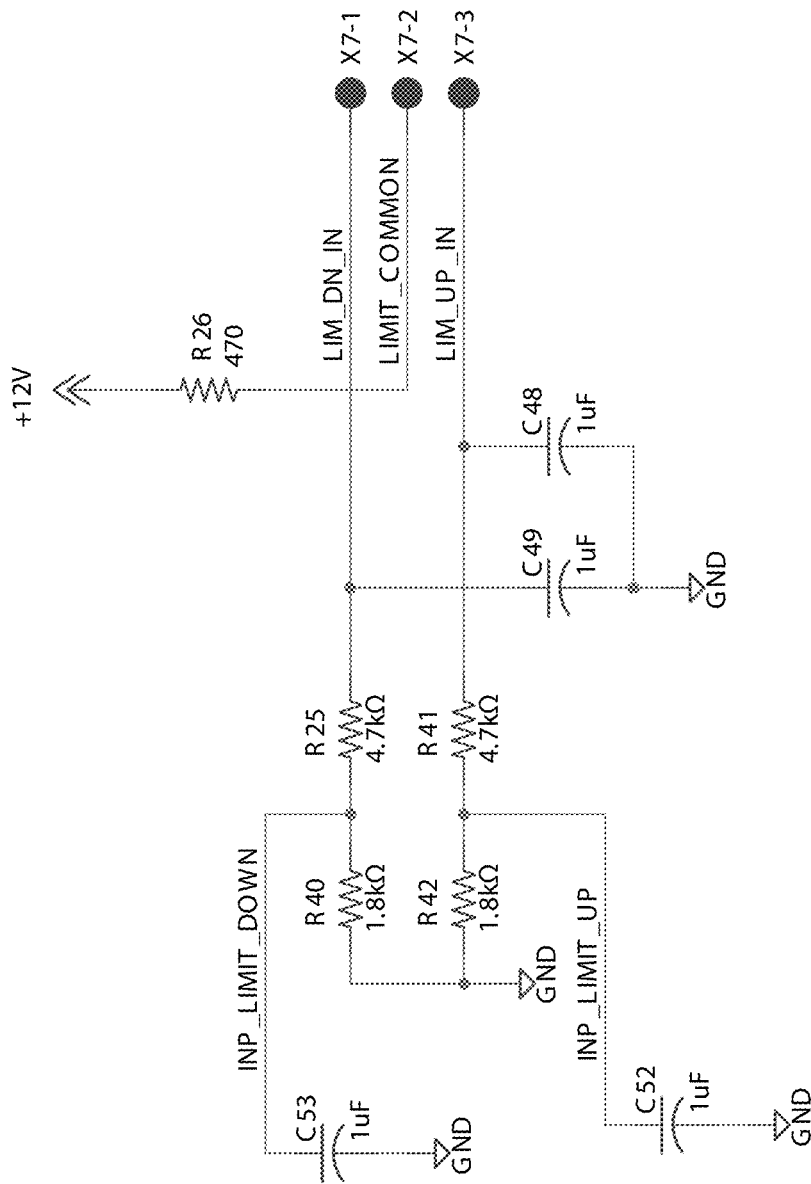
Figure 5I:
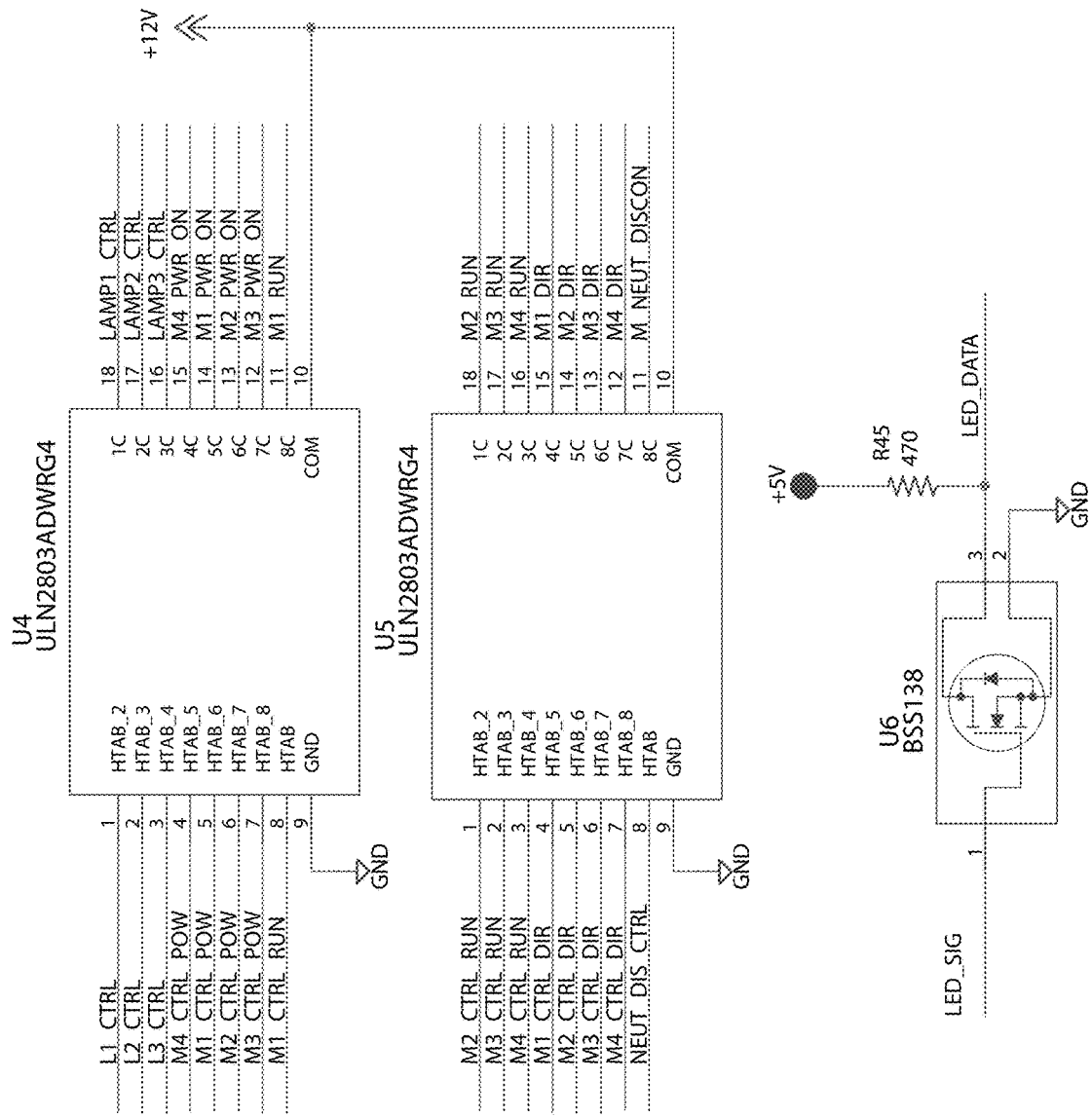
Figure 5J:
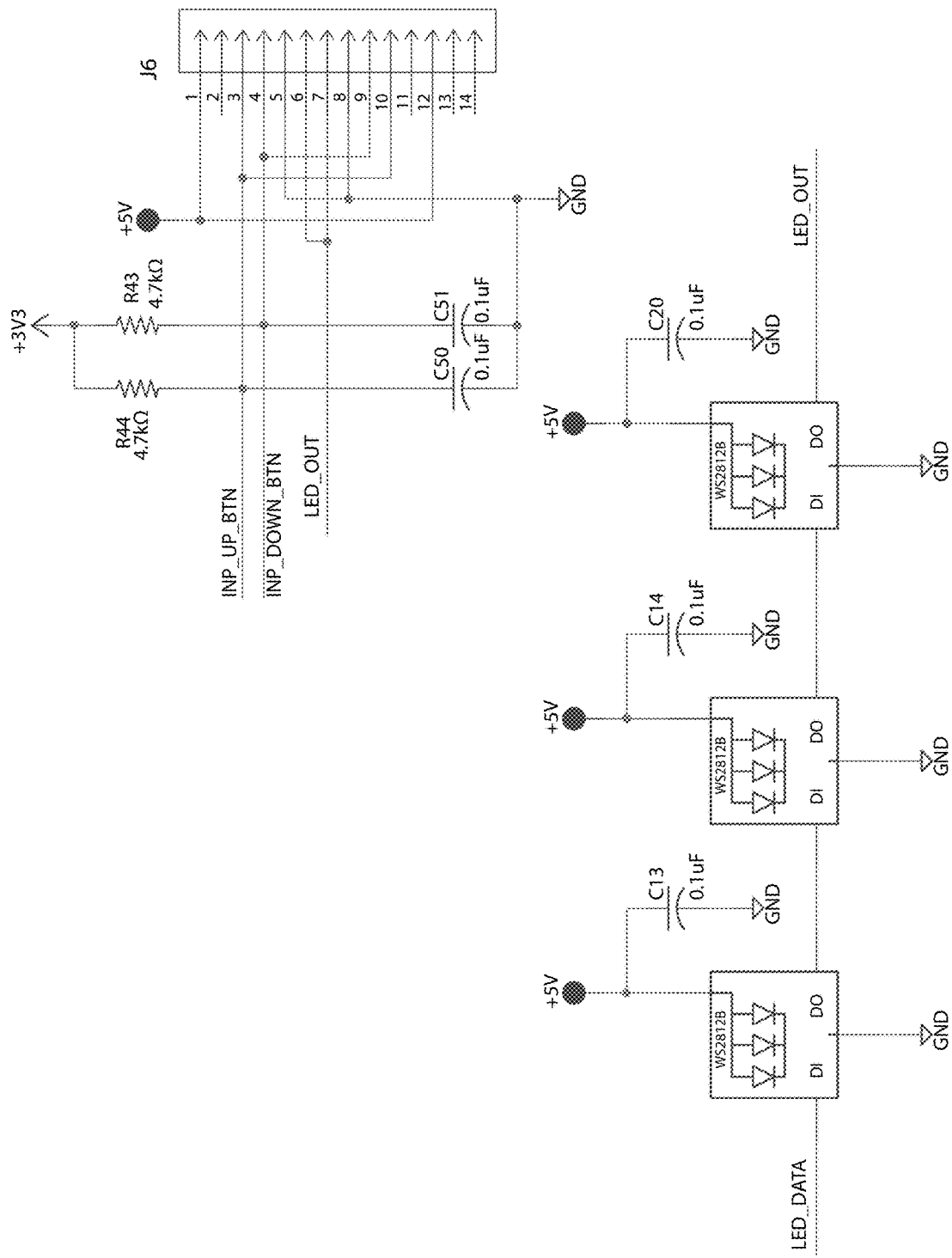
Figure 5K:
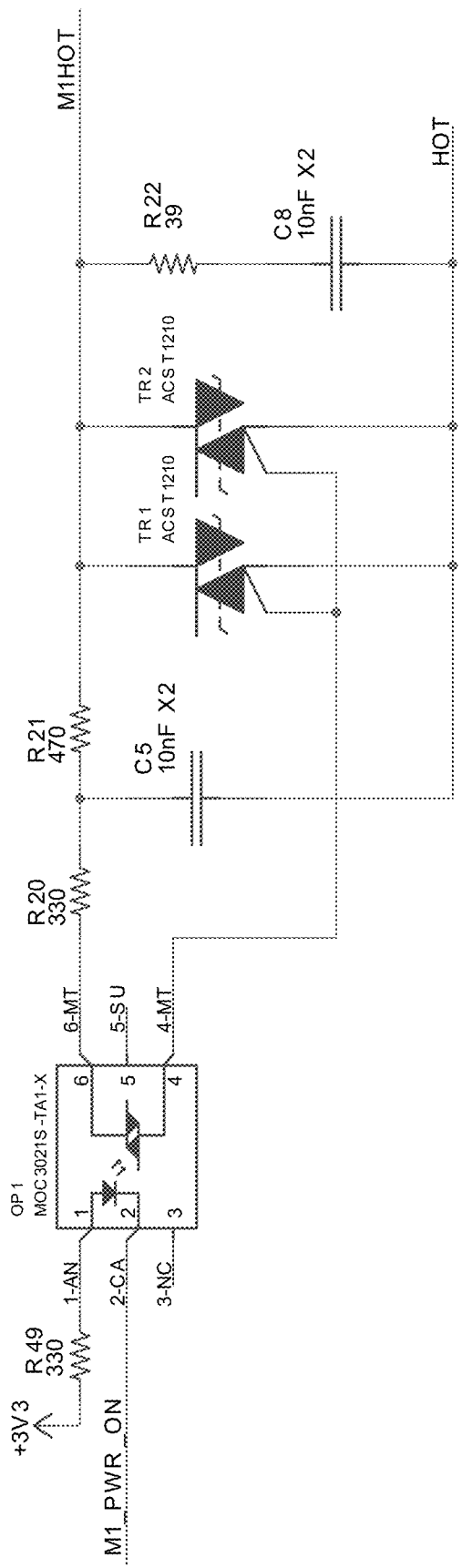
Figure 5L:
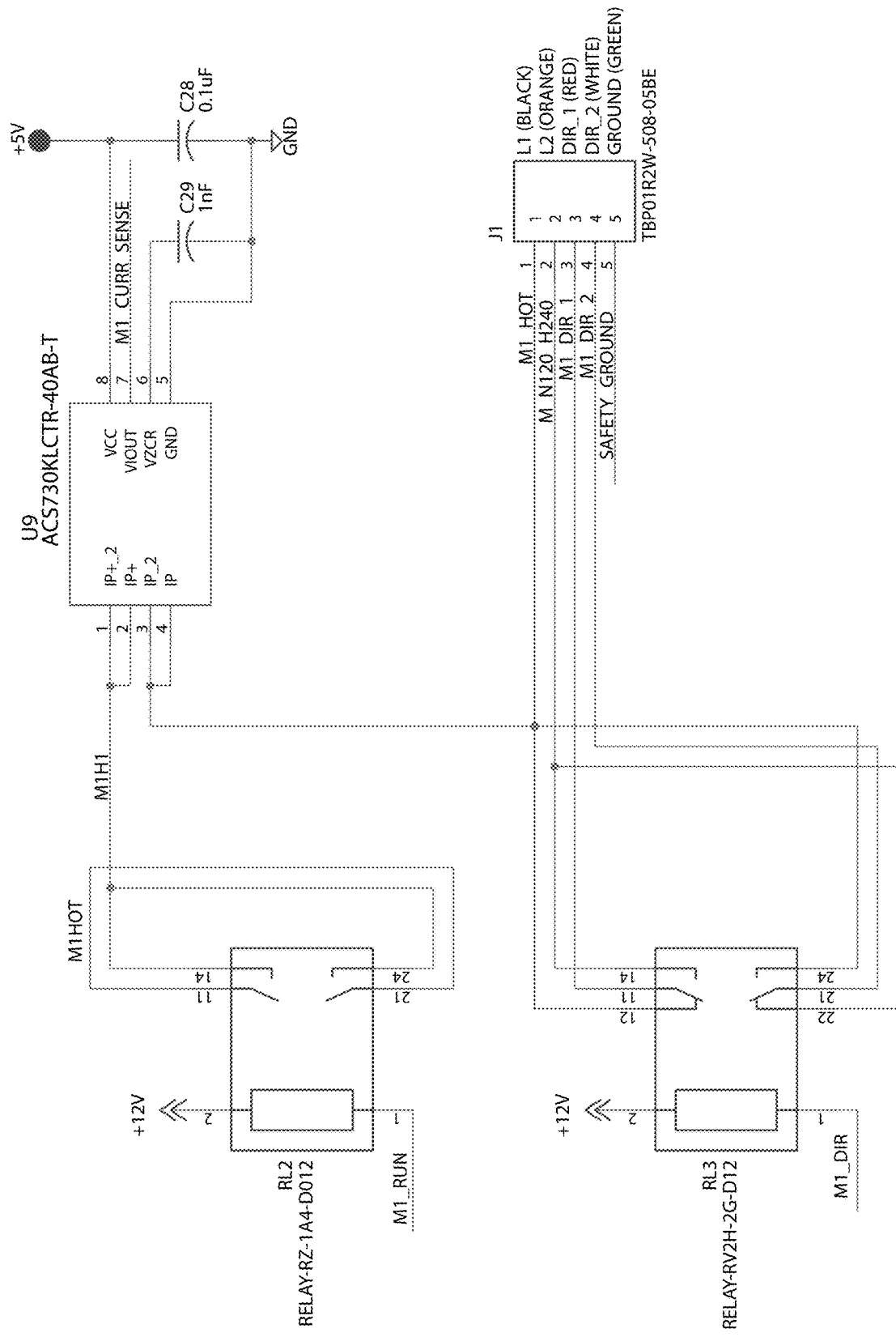
Figure 5M:
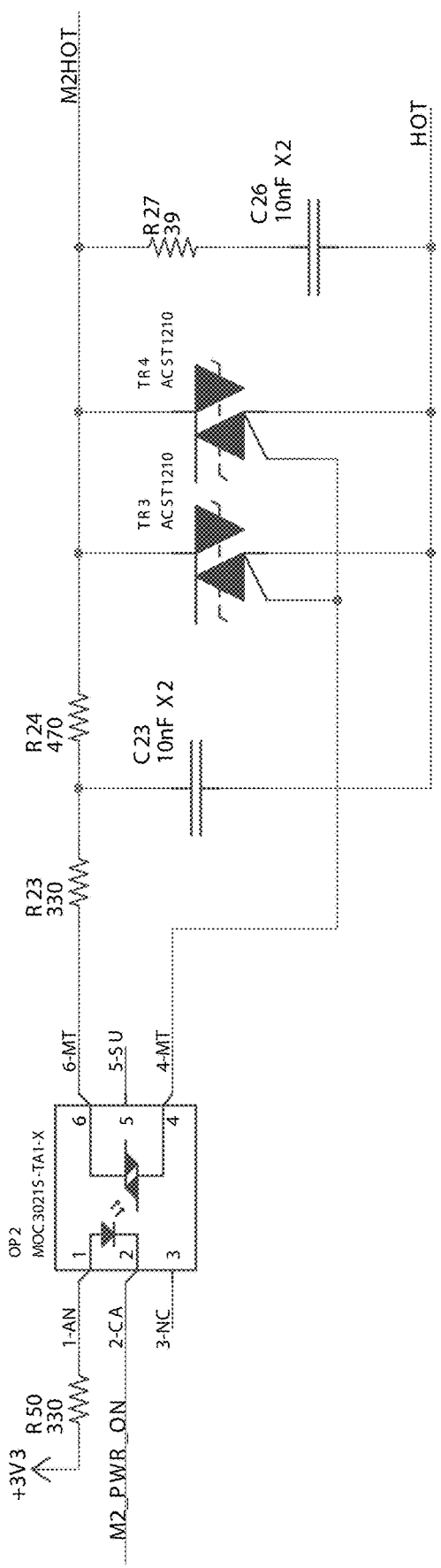
Figure 5N:
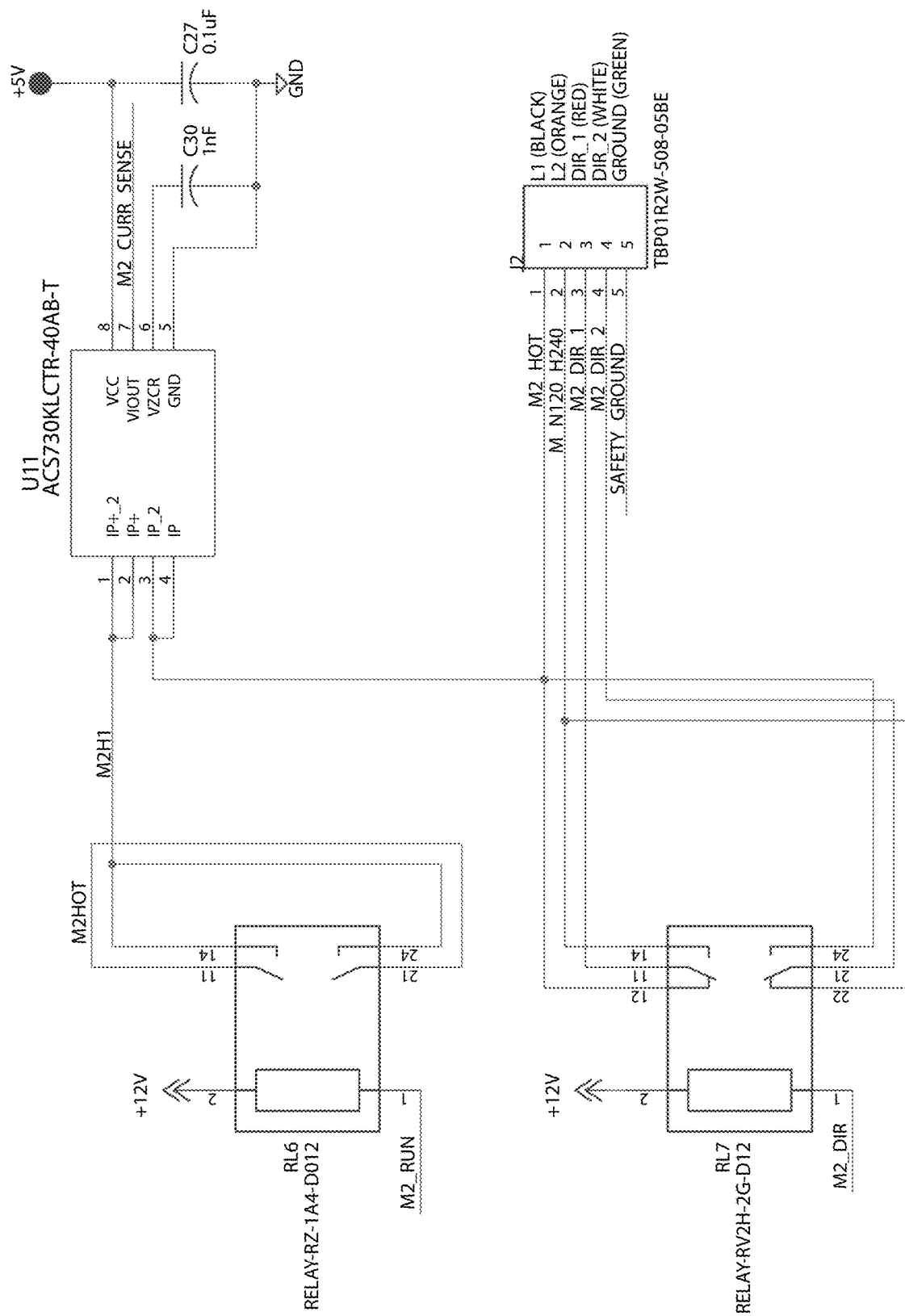
Figure 50:
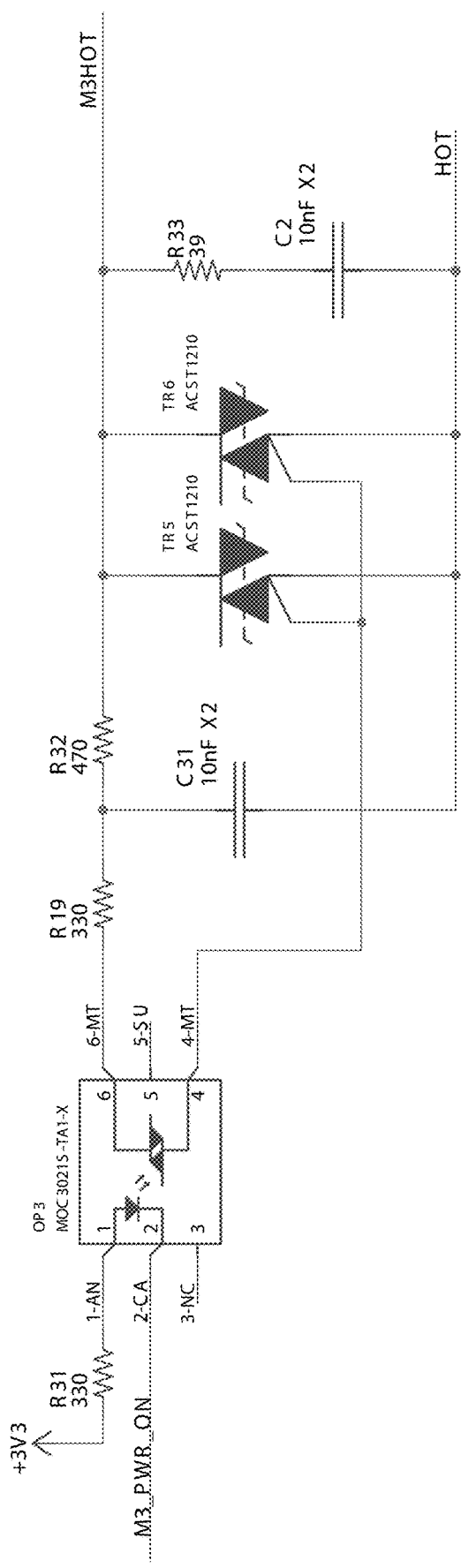
Figure 5P:
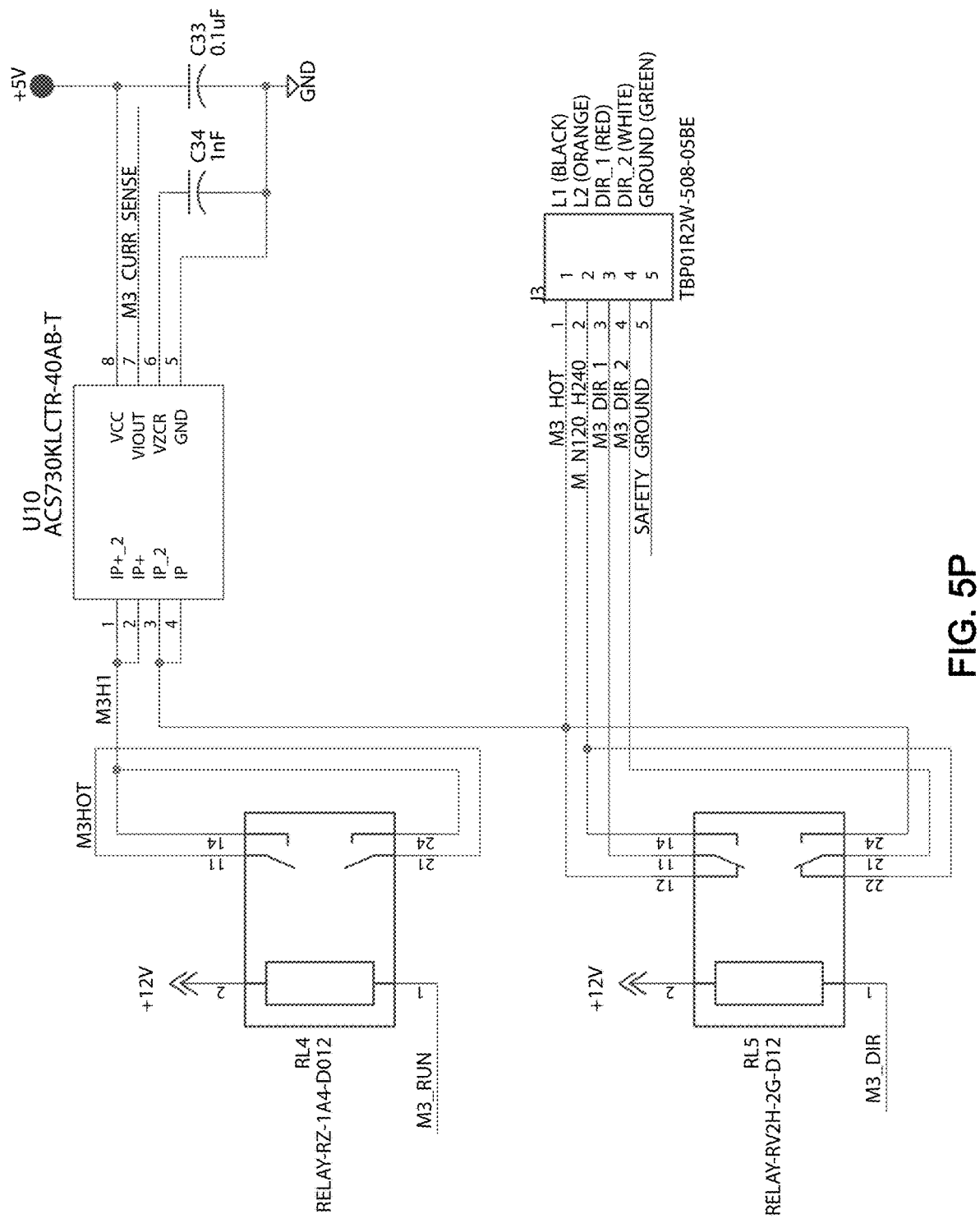
Figure 5Q:
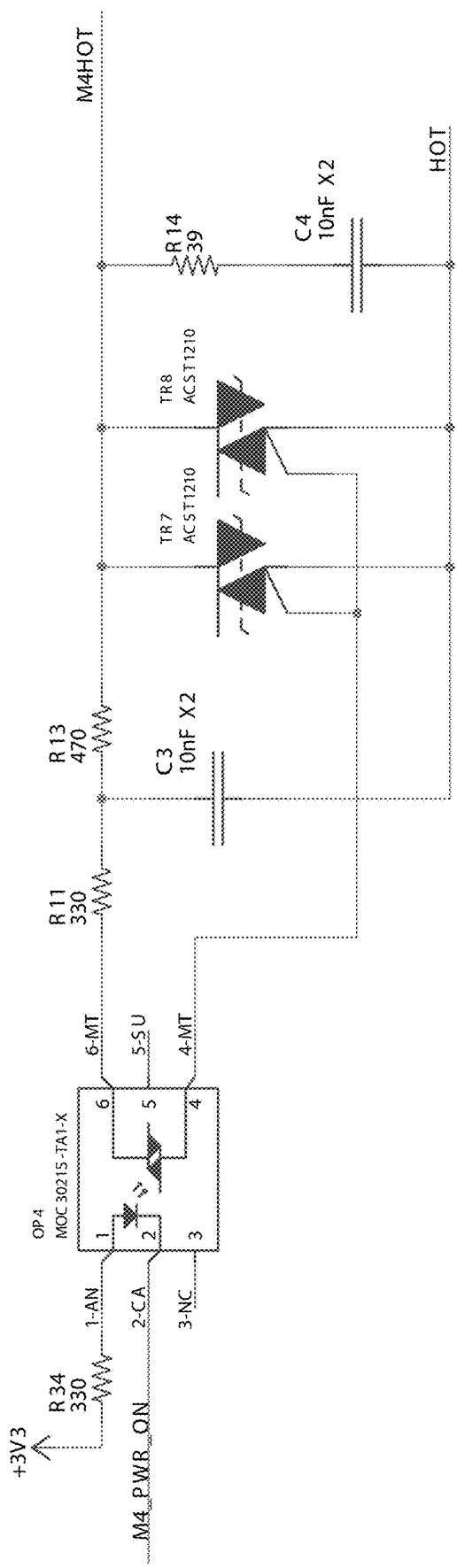
Figure 5R:
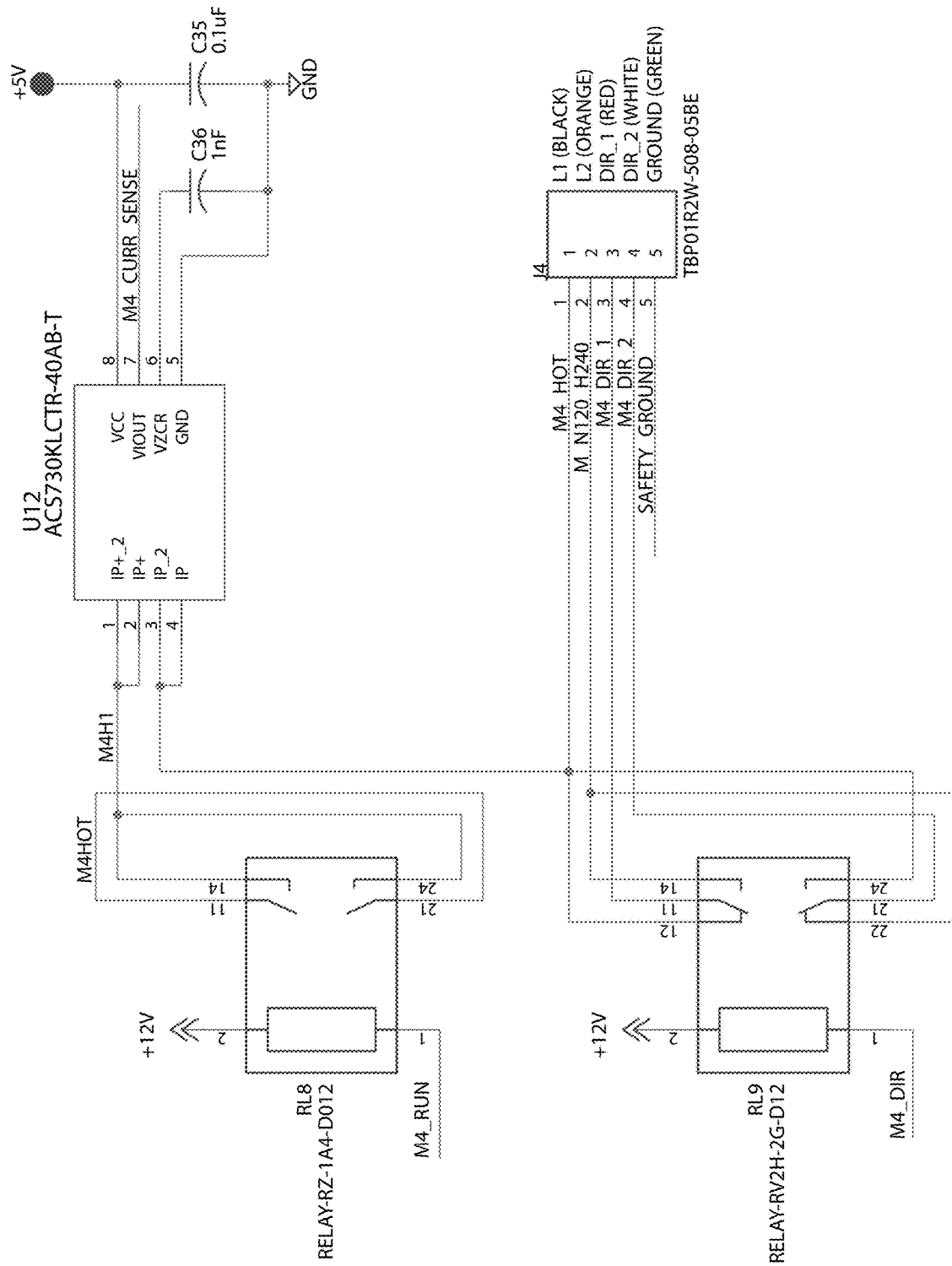

Originally filed FIG. 5B shows a power supply (AC/DC) with 12 VDC output, DC/DC converter circuits for 5V and 3.3V DC rails, and two WiFi modules and supporting programming terminals, and pushbuttons. Originally filed FIG. 5C shows three lighting circuits, each including an opto-isolator, Triac, and connector. Originally filed FIG. 5C also shows a light circuit current sensor (one for all light circuits). Originally filed FIG. 5D shows a microcontroller, serial LED drive circuitry, Darlington transistor packs (for driving relays and opto-isolators directly from microcontroller), resistor packs (for current sensor inputs conditioning), limit switch input circuitry and connector, and "Emergency UP/DOWN" pushbuttons (to manually override controls). Also shown are limit switches. It is understood that these and other connected components can form part of the boat lift 10.

Mobile device 30 may or may not include an application (or app) executing thereon that utilizes security, such as that provided by Amazon® Web Services. Mobile device 30 may communicate with more than one controller 200, such that mobile device 30 can be part of multiple control systems. Mobile device 30 may allow an operator to control motors 18 simultaneously or to separately control a subset of the motors 18 in boat lift 10 (e.g., to level platform 11). Mobile device 30 may allow the operator to move platform 11 to an upper limit with the press of a button or icon. Similarly, mobile device 30 may allow the operator to move platform 11 to a lower limit with the press of a button or icon. Mobile device 30 may allow the operator to move platform 11 in smaller increments or to allow continuous movement while an icon or button is being pressed. Mobile device 30 may also enable the operator to control all of or a subset of lights 12 connected to controller 200. More than one mobile device 30 may be able to control a given controller 200, and corresponding motors 18 and lights 12. A given mobile device 30 may allow for multiple users to be assigned access to operate boat lift 10. So for example, family members could each have their own access to control boat lift 10 via an app (operating on the same or different mobile devices 30).

Controller 200 may provide an automatic power-down or power-off feature that via software operating on processor 220 turns OFF or disables circuitry that powers or drives motors 18 under certain conditions. This may prevent inadvertent startup of boat lift 10 due to human error and natural occurrences such as lighting (which can cause a failure with electromagnetic contactors).

Current sensors 250 may indicate to processor 220 whether excessive current is being drawn while a given motor 18 is operating, and this may indicate a damaged or stalled motor 18. Responsively, processor 220 may shut down the circuits that drive motors 18 and cause an alert to be sent to the remote to notify the user at a mobile device 30. Parameters based on nominal current loads of motors 18 may be used to stop the function of motors 18 (or lights 12) before damage occurs.

Processor 220 may be able to effect other safety or advantageous actions. For example, after a given period of inactivity (e.g., 10 seconds), relays may open to disconnect motors 18 from any live power on the main power circuits and grounds as well as the direction control circuits.

Controller 200 may be housed in a housing that is protected by a physical lock (e.g., padlock) or keyed switch as a means of security to keep unwanted users out of controller. These are mechanical deterrents only and can be bypassed. Boat lift 10 disclosed herein may utilize a password-protected security system via mobile device 30 that can only be unlocked, for example, via a password or PIN by an authorized user. Override switches 280 may be overrideable via mobile device 30 for added security. If override switches 280 include emergency up/down switches, they may not be able to be disabled or overridden by mobile device, but they may be locked down by use of security screws or fasteners on a housing of controller 200 that require a special bit to remove. Controller 200 may also send notifications to mobile device 30. So if boat lift 10 moves, up or down, the operator could receive a notification on mobile device 30.

Controller 200 may also provide a WiFi hotspot in the region of controller 200. This may further allow for additional components, services, or subsystems to be integrated or enabled by boat lift 10 disclosed herein, such as video security, music services, or TV services.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A control system for controlling at least one motor on a boat lift, the control system comprising:
   a processor configured to output a first digital-relay control signal and a first power-isolation relay control signal;
   a first digital relay including a control input, a high-voltage input, and a high-voltage output, wherein the control input of the first digital relay is configured to receive the first digital-relay control signal from the processor, wherein the high-voltage input of the first digital relay is configured to receive high voltage, wherein the high-voltage output of the first digital relay is configured to selectively output the high voltage based on a state of the first digital-relay control signal;
   a first power-isolation relay configured to selectively isolate the high voltage from a first motor, wherein the first power-isolation relay includes a control input, a high-voltage input, and a high-voltage output, wherein the control input of the first power-isolation relay is configured to receive the first power-isolation relay control signal from the processor, wherein the high-voltage input of the first power-isolation relay is configured to receive the high-voltage from the output of the first switching component, wherein the high-voltage output of the first power-isolation relay is configured to selectively supply the high voltage to the first motor based on a state of the first power-isolation relay control signal;
   wherein the processor is configured to cause the first motor to be energized by:
      changing a state of the first power-isolation relay control signal to actuate the first power-isolation relay, such that the high-voltage input of the first power-isolation relay becomes electrically connected to the high-voltage output of the first power-isolation relay, and
      after said changing the state of the first power-isolation relay control signal to actuate the first power-isolation relay, changing a state of the first digital-relay control signal to activate the first digital relay, such that the high-voltage input of the first digital relay becomes electrically connected to the high-voltage output of the first power-isolation relay; and
   wherein the processor is configured to cause the first motor to be de-energized by:
      changing a state of the first digital-relay control signal to deactivate the first digital relay, such that the high-voltage input of the first digital relay becomes electrically disconnected to the high-voltage output of the first digital relay, and
      after said changing the state of the first digital-relay control signal to deactivate the first digital relay, changing a state of the first power-isolation relay control signal to de-actuate the first power-isolation relay, such that the high-voltage input of the first power-isolation relay becomes electrically disconnected from the high-voltage output of the first power-isolation relay.

2. The control system of claim 1, wherein the first power-isolation relay comprises a mechanical relay.

3. The control system of claim 1, further comprising a first motor-direction-select relay including a control input, a high-voltage input, a neutral input, a first output, and a second output,
   wherein the processor is configured to output a first direction-control signal, wherein the first direction-control signal comprises a forward state and a reverse state,
   wherein the control input of the first motor-direction-selection relay is configured to receive the first direction-control signal, the high-voltage input of the first motor-direction-select relay is configured to receive the high voltage, the neutral input of the first motor-direction-select relay is configured to receive neutral,
   wherein, when the first direction-control signal is in the forward state, the first motor-direction-select relay is configured to electrically connect the first output with the high-voltage input and electrically connect the second output with the neutral input, and
   wherein, when the first direction-control signal is in the reverse state, the first motor-direction-select relay is configured to electrically connect the first output with the neutral input and electrically connect the second output with the high-voltage input.

4. The control system of claim 3, wherein the processor is further configured to energize the first motor by, before said changing the state of the first digital-relay control signal to activate the first digital relay, changing the state of the first direction-control signal to either the forward state or the reverse state.

5. The control system of claim 3, wherein the first motor-direction-select relay comprises a double-pole double-throw (DPDT) relay.

6. The control system of claim 1, wherein the processor is further configured to output a second digital-relay control signal independently from the first digital-relay control signal, and wherein the processor is further configured to output a second power-isolation relay control signal independently from the first power-isolation relay control signal;
   a second digital relay including a control input, a high-voltage input, and a high-voltage output, wherein the control input of the second digital relay is configured to receive the second digital-relay control signal from the processor, wherein the high-voltage input of the second digital relay is configured to receive the high voltage, wherein the high-voltage output of the second digital relay is configured to selectively output the high voltage based on a state of the second digital-relay control signal;
   a second power-isolation relay configured to selectively isolate the high voltage from a second motor, wherein the second power-isolation relay includes a control input, a high-voltage input, and a high-voltage output, wherein the control input of the second power-isolation relay is configured to receive the second power-isolation relay control signal from the processor, wherein the high-voltage input of the second power-isolation relay is configured to receive the high voltage from the output of the second switching component, wherein the high-voltage output of the second power-isolation relay is configured to selectively supply the high voltage to the second motor based on a state of the second power-isolation relay control signal;

wherein the processor is configured to cause the second motor to be energized by:

changing a state of the second power-isolation relay control signal to actuate the second power-isolation relay, such that the high-voltage input of the second power-isolation relay becomes electrically connected to the high-voltage output of the second power-isolation relay, and after said changing the state of the second power-isolation relay control signal to actuate the second power-isolation relay, changing a state of the second digital-relay control signal to activate the second digital relay, such that the high-voltage input of the second digital relay becomes electrically connected to the high-voltage output of the second power-isolation relay; and wherein the processor is configured to cause the second motor to be de-energized by:

changing a state of the second digital-relay control signal to deactivate the second digital relay, such that the high-voltage input of the second digital relay becomes electrically disconnected to the high-voltage output of the second digital relay, and after said changing the state of the second digital-relay control signal to deactivate the second digital relay, changing a state of the second power-isolation relay control signal to de-actuate the second power-isolation relay, such that the high-voltage input of the second power-isolation relay becomes electrically disconnected from the high-voltage output of the second power-isolation relay.

7. The control system of claim 6, wherein the second power-isolation relay comprises a mechanical relay.

8. The control system of claim 6, further comprising a second motor-direction-select relay including a control input, a high-voltage input, a neutral input, a first output, and a second output, wherein the processor is configured to output a second direction-control signal, wherein the second direction-control signal comprises a forward state and a reverse state, wherein the control input of the second motor-direction-selection relay is configured to receive the second direction-control signal, the high-voltage input of the second motor-direction-select relay is configured to receive the high voltage, the neutral input of the second motor-direction-select relay is configured to receive neutral, wherein, when the second direction-control signal is in the forward state, the second motor-direction-select relay is configured to electrically connect the first output with the high-voltage input and electrically connect the second output with the neutral input, and wherein, when the second direction-control signal is in the reverse state, the second motor-direction-select relay is configured to electrically connect the first output with the neutral input and electrically connect the second output with the high-voltage input.

9. The control system of claim 8, wherein the processor is further configured to energize the motor by, before said changing the state of the second digital-relay control signal to activate the second digital relay, changing the state of the second direction-control signal to one of the forward state or the reverse state.

10. The control system of claim 6, wherein:

the processor is further configured to control the first digital-relay control signal and the second digital-relay control signal synchronously;

the processor is further configured control the first power-isolation relay control signal and the second power-isolation relay control signal synchronously;

the processor is further configured to control the first digital-relay control signal and the second digital-relay control signal synchronously;

the processor is further configured control the first power-isolation relay control signal and the second power-isolation relay control signal synchronously; and the processor is further configured to control the first direction-control signal and the second direction-control signal synchronously.

11. The control system of claim 6, further comprising:

a first current sensor configured to measure a current provided to the first motor and output a first current signal, wherein the processor is configured to receive the first current signal and determine an irregularity based on the first current signal; and a second current sensor configured to measure a current provided to the second motor and output a second current signal, wherein the processor is configured to receive the second current signal and determine an irregularity based on the second current signal.

12. A control system for controlling at least one motor on a boat lift, the control system comprising:

a processor configured to output at least one high-voltage-relay control signal and at least one additional signal;

at least one high-voltage relay, each of the at least one high-voltage relay including a high-voltage input configured to receive high voltage, a high-voltage output configured to be electrically connected to a corresponding at least one motor, and a control input configured to receive a corresponding at least one high-voltage-relay control signal, wherein each of the at least one high-voltage relay is configured to selectively electrically connect or disconnect the high-voltage input to the high-voltage output based on a state of the corresponding at least one high-voltage-relay control signal; and at least one additional relay, each including an input, an output configured to electrically connect to each of the at least one motor, and a control input configured to receive a corresponding at least one additional signal, wherein each of the at least one additional relay is configured to selectively electrically connect or disconnect the input to the output based on a state of the corresponding at least one additional signal, wherein the processor is configured to change a state for each of the at least one additional signal during a process in which each of the at least one high-voltage relay is controlled to electrically connect the high-voltage input with the high-voltage output, such that each of the at least one additional relay electrically connects the input with the output, and wherein the processor is configured to change a state for each of the at least one additional signal during a process in which each of the at least one high-voltage relay is controlled to electrically disconnect the high-voltage input with the high-voltage output, such that each of the at least one additional relay electrically disconnects the input from the output, wherein the input of each of the at least one additional relay is configured to be connected to at least one of ground or neutral.

13. The control system of claim 12, wherein the input at least one of the at least one additional relay is configured to be connected to ground.

14. The control system of claim 12, wherein the input of at least one of the at least one additional relay is configured to be connected to neutral.

15. The control system of claim 12, wherein the at least one additional relay comprises a first additional relay for which the input is configured to be connected to ground, and a second additional relay for which the input is configured to be connected to neutral.

16. A control system for controlling at least one motor on a boat lift having a movable frame that moves in response to movement of the at least one motor, the control system comprising:
   at least one relay configured to selectively switch power to a corresponding one of the at least one motor;
   at least one current sensor, each configured to measure current flowing to a corresponding one of the at least one motor and responsively generate a corresponding at least one current sensor signal;
   a processor configured to control the at least one relay to turn ON the at least one motor, receive the at least one current sensor signal, determine an inferred vertical position of the moveable frame based on the at least one current sensor signal, and turn OFF the at least one motor when the inferred vertical position of the moveable reaches at least one predetermined limit.

17. The control system of claim 16, wherein the at least one predetermined limit comprises a maximum inferred vertical position limit and a minimum inferred vertical position limit.

18. The control system of claim 16, wherein the processor is configured to determine the inferred vertical position of the moveable frame by processing the at least one current signal to track changes in a phase of the corresponding at least one motor.

19. The control system of claim 18, wherein the processor is configured to determine the inferred vertical position of the moveable frame by processing the at least one current sensor signal to count a number of revolutions of a shaft in the corresponding at least one motor.

20. The control system of claim 19, wherein the processor is further configured to transmit feedback to a device across a network, wherein the feedback includes information about the inferred vertical position off the moveable frame.

* * * * *